(12) United States Patent
Yang et al.

(10) Patent No.: US 11,049,262 B2
(45) Date of Patent: Jun. 29, 2021

(54) METHODS AND SYSTEMS FOR DATA VISUALIZATION

(71) Applicant: ZHEJIANG DAHUA TECHNOLOGY CO., LTD., Zhejiang (CN)

(72) Inventors: Li Yang, Hangzhou (CN); Jianhua Xiang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 238 days.

(21) Appl. No.: 16/406,297

(22) Filed: May 8, 2019

(65) Prior Publication Data

US 2019/0266733 A1  Aug. 29, 2019

Related U.S. Application Data

(63) Continuation of application No. PCT/CN2017/091452, filed on Jul. 3, 2017.

(30) Foreign Application Priority Data

Nov. 8, 2016 (CN) .......................... 201610981492.6

(51) Int. Cl.
*G06K 9/00* (2006.01)
*G06T 7/246* (2017.01)
(Continued)

(52) U.S. Cl.
CPC ................ *G06T 7/246* (2017.01); *G06K 9/00* (2013.01); *G06K 9/00771* (2013.01);
(Continued)

(58) Field of Classification Search
CPC . G06T 7/246; G06T 7/11; G06T 2207/10024; G06T 2207/10016;
(Continued)

(56) References Cited

U.S. PATENT DOCUMENTS 7,650,012 B2 * 1/2010 Shibuya .................... G06T 7/55
382/103
7,729,513 B2 * 6/2010 Ohkubo ............. G06K 9/00805
382/104

(Continued)

FOREIGN PATENT DOCUMENTS

CN        101098465 A     1/2008
CN        102231820 A    11/2011
(Continued)

OTHER PUBLICATIONS

Extended European Search Report in European Application No. 17869139.0 dated Oct. 8, 2019, 8 pages.
(Continued)

*Primary Examiner* — Samir A Ahmed
(74) *Attorney, Agent, or Firm* — Metis IP LLC

(57) ABSTRACT

The present disclosure relates to methods and systems for data visualization. The systems may perform the methods to obtain a video having a plurality of frames including a plurality of objects; identify a target object from the plurality of objects according to the plurality of frames; determine one or more track points of the target object, each of the one or more track points being corresponding to the target object in one of the plurality of frames; determine a first track of the target object based on the track points, the first track including at least one of the one or more track points of the target object; determine a second track of the target object based on the first track, the second track including at least one of the track points of the first track; generate a video analysis result by analyzing the second track; and visualize the video analysis result.

20 Claims, 13 Drawing Sheets

(51) Int. Cl.
  *G06T 7/11* (2017.01)
  *G06K 9/46* (2006.01)
  *H04N 7/18* (2006.01)
  *H04N 21/44* (2011.01)
  *H04N 21/234* (2011.01)

(52) U.S. Cl.
  CPC .............. *G06K 9/4604* (2013.01); *G06T 7/11* (2017.01); *H04N 7/18* (2013.01); *H04N 21/23418* (2013.01); *H04N 21/44008* (2013.01); *G06T 2207/10016* (2013.01); *G06T 2207/10024* (2013.01); *G06T 2207/30241* (2013.01)

(58) Field of Classification Search
  CPC ... G06T 2207/30241; G06T 7/20; G06K 9/00; G06K 9/00771; G06K 9/4604; H04N 7/18; H04N 21/44008; H04N 21/23418
  See application file for complete search history.

(56) References Cited

U.S. PATENT DOCUMENTS

| | | | |
|---|---|---|---|
| 8,811,673 | B1 | 8/2014 | Fleites et al. |
| 9,072,929 | B1* | 7/2015 | Rush ..................... G16H 20/30 |
| 2005/0105764 | A1 | 5/2005 | Han et al. |
| 2006/0088191 | A1* | 4/2006 | Zhang ..................... G06T 7/246 |
| | | | 382/107 |
| 2012/0053828 | A1* | 3/2012 | Haneishi ................ G01C 21/20 |
| | | | 701/408 |
| 2013/0022234 | A1* | 1/2013 | U S .......................... G06T 7/20 |
| | | | 382/103 |
| 2015/0262378 | A1* | 9/2015 | Kuehnle .................. G06T 7/20 |
| | | | 382/103 |
| 2015/0344853 | A1* | 12/2015 | Monsan .............. C08B 37/0021 |
| | | | 536/23.2 |
| 2016/0065906 | A1 | 3/2016 | Boghossian et al. |
| 2016/0224838 | A1 | 8/2016 | Sengupta et al. |
| 2016/0225121 | A1* | 8/2016 | Gupta ........................ G06T 3/00 |
| 2016/0260226 | A1 | 9/2016 | Yano et al. |
| 2016/0321507 | A1 | 11/2016 | Yang |
| 2017/0351924 | A1 | 12/2017 | Hotta et al. |
| 2018/0096225 | A1* | 4/2018 | Liu ....................... G06K 9/4604 |
| 2018/0203467 | A1* | 7/2018 | Zhou ........................ G06T 7/20 |

FOREIGN PATENT DOCUMENTS

| | | |
|---|---|---|
| CN | 102819847 A | 12/2012 |
| CN | 103227963 A | 7/2013 |
| CN | 103955494 A | 7/2014 |
| CN | 104156987 A | 11/2014 |
| CN | 104717573 A | 6/2015 |
| CN | 105049674 A | 11/2015 |
| CN | 105227902 A | 1/2016 |
| CN | 105447458 A | 3/2016 |
| JP | H10336506 A | 12/1998 |
| WO | 2016077010 A1 | 5/2016 |
| WO | 2015086360 A1 | 5/2018 |

OTHER PUBLICATIONS

International Search Report in PCT/CN2017/091452 dated Sep. 26, 2017, 4 pages.

Written Opinion in PCT/CN2017/091452 dated Sep. 28, 2017, 5 pages.

First Office Action in Chinese Application No. 201610981492.6 dated Nov. 19, 2018, 14 pages.

* cited by examiner

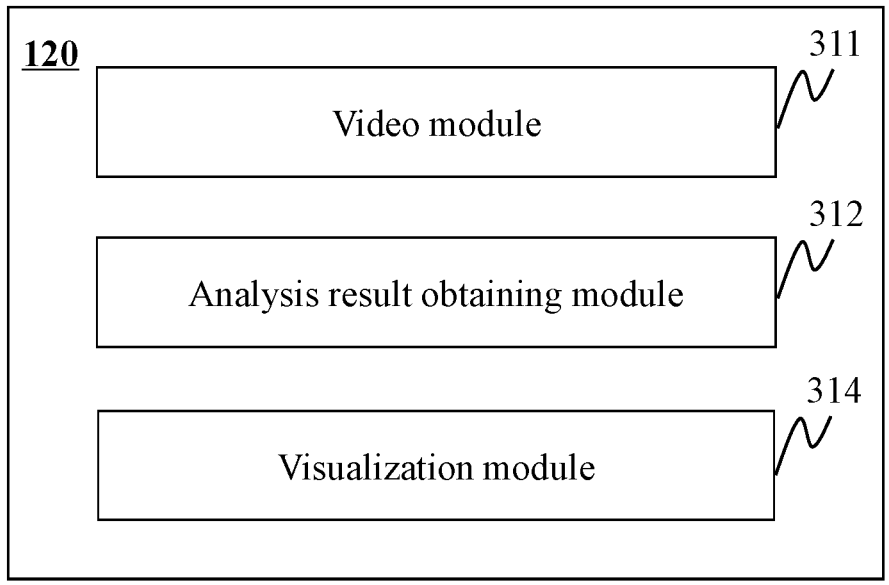
FIG. 3-A
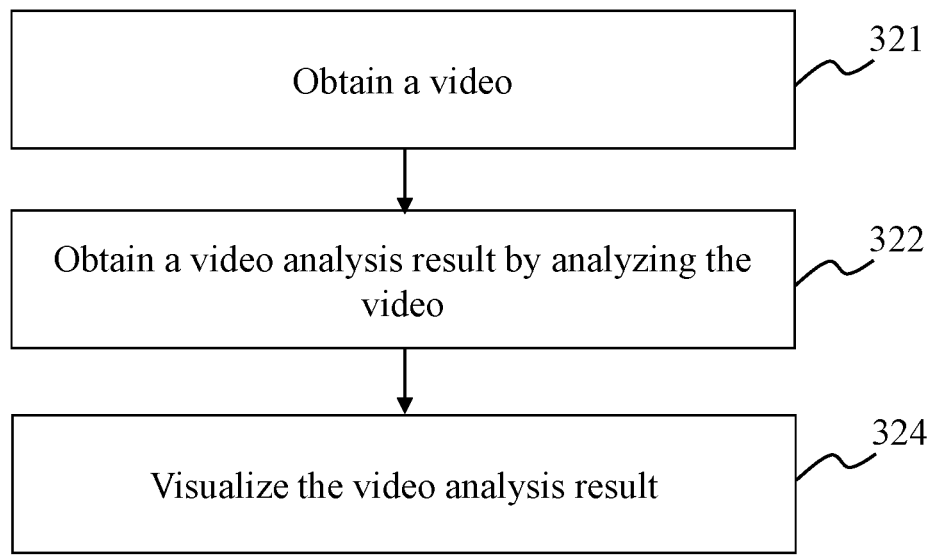
FIG. 3-B

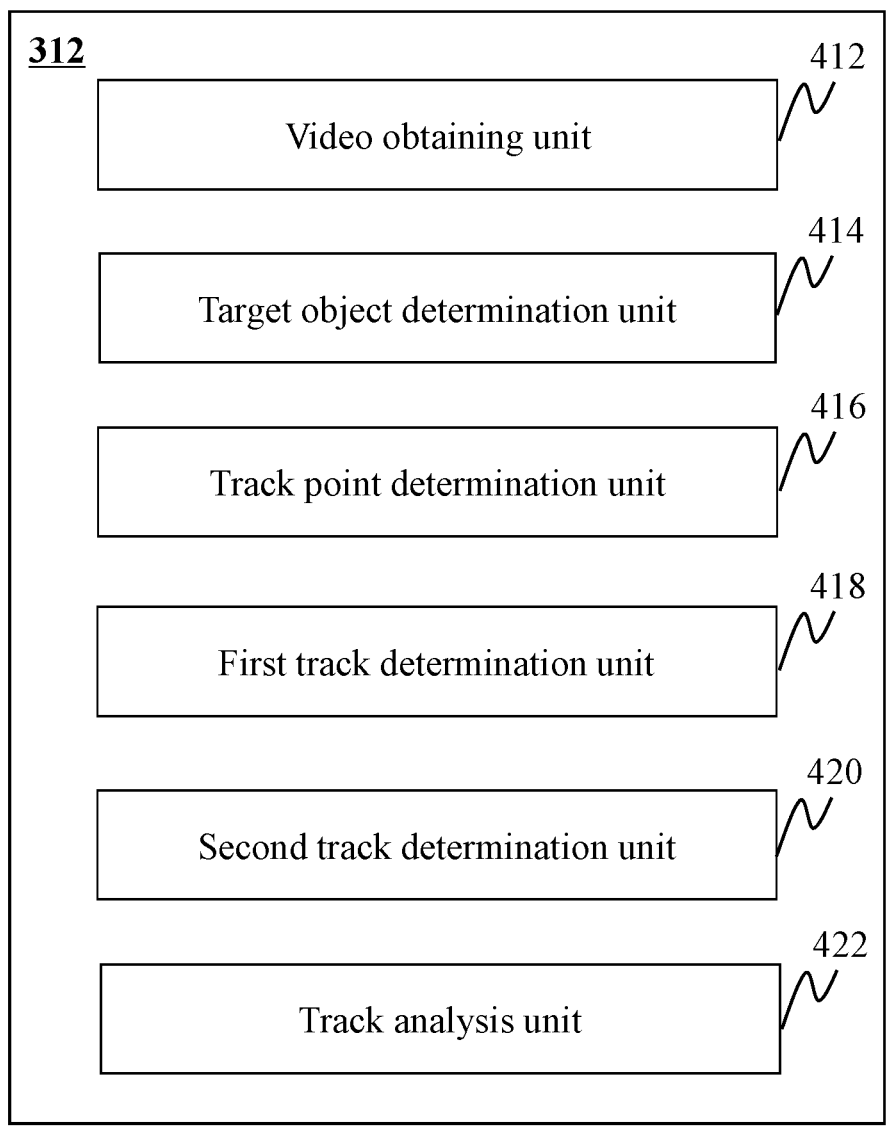
FIG. 4-A

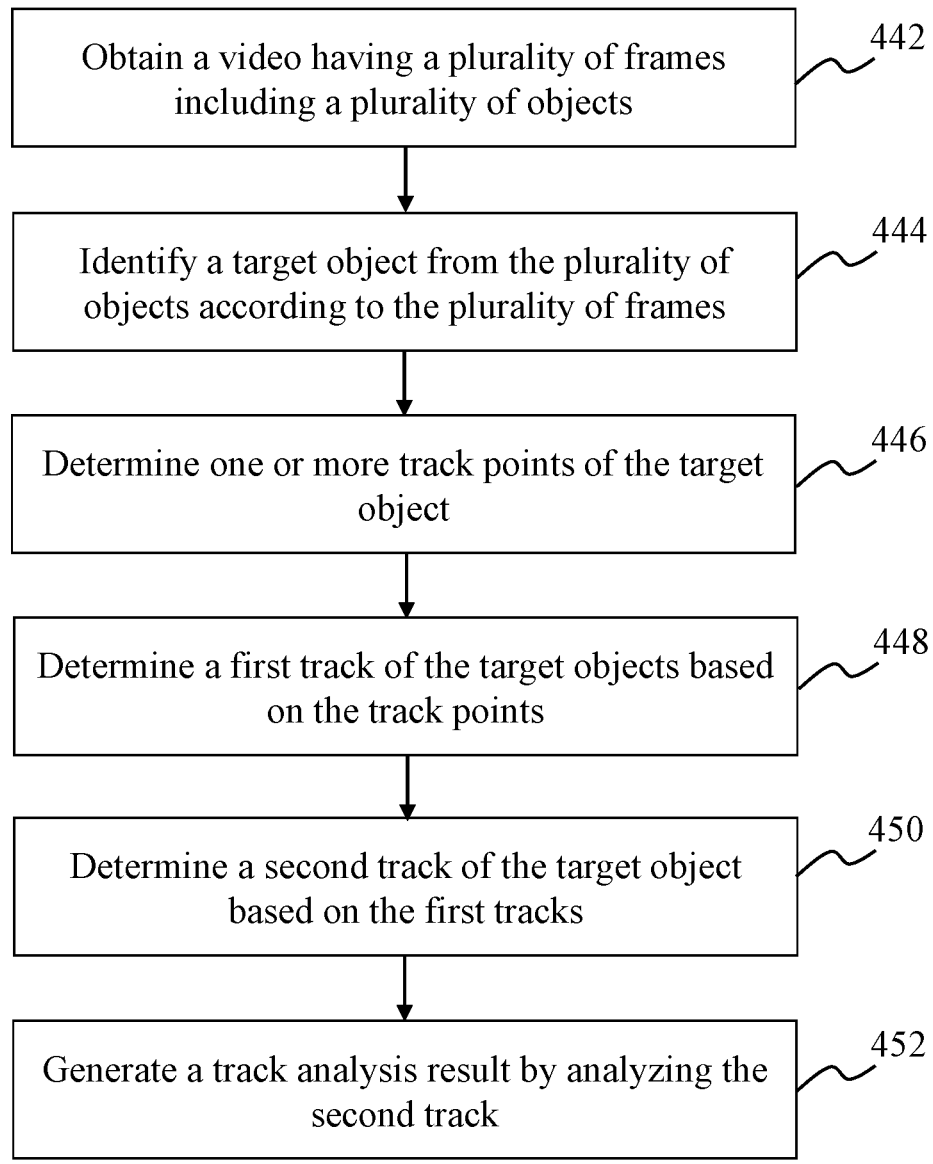
FIG. 4-B

METHODS AND SYSTEMS FOR DATA VISUALIZATION

CROSS-REFERENCE TO RELATED APPLICATIONS

This application is a continuation of International Application No. PCT/CN2017/091452, filed on Jul. 3, 2017, which claims priority of Chinese Patent Application No. 201610981492.6 filed on Nov. 8, 2016, the contents of each of which are hereby incorporated by reference.

TECHNICAL FIELD

The present disclosure generally relates to data visualization, and more specifically relates to methods and systems for visualizing video analysis.

BACKGROUND

There are various tools for data visualization, for example, the method using a static heat map, a dynamic heat map, or a track map. However, these tools for data visualization are not applied to the video field to visualize analysis data of moving objects in a video because of some limiting conditions such as perspective effect in the video. Therefore, it is desirable to provide methods and systems for data visualization that visualize analysis data of moving objects in a video.

SUMMARY

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

According to a first aspect of the present disclosure, a computer-implemented method may include one or more of the following operations: obtaining a video having a plurality of frames including a plurality of objects; identifying a target object from the plurality of objects according to the plurality of frames; determining one or more track points of the target object, each of the one or more track points being corresponding to the target object in one of the plurality of frames; determining a first track of the target object based on the track points, the first track including at least one of the one or more track points of the target object; determining a second track of the target object based on the first track, the second track including at least one of the track points of the first track; generating a video analysis result by analyzing the second track; and visualizing the video analysis result.

According to a second aspect of the present disclosure, a system may include one or more storage devices and one or more processors configured to communicate with the one or more storage devices. The one or more storage devices may include a set of instructions. When the one or more processors executing the set of instructions, the one or more processors may be directed to perform one or more of the following operations. The one or more processors may obtain a video having a plurality of frames including a plurality of objects. The one or more processors may identify a target object from the plurality of objects according to the plurality of frames. The one or more processors may determine one or more track points of the target object, each of the one or more track points being corresponding to the target object in one of the plurality of frames. The one or more processors may determine a first track of the target object based on the track points, the first track including at least one of the one or more track points of the target object. The one or more processors may determine a second track of the target object based on the first track, the second track including at least one of the track points of the first track. The one or more processors may generate a video analysis result by analyzing the second track. The one or more processors may visualize the video analysis result.

According to a third aspect of the present disclosure, a non-transitory computer readable medium may comprise at least one set of instructions. The at least one set of instructions may be executed by one or more processors of a computer device. The one or more processors may obtain a video having a plurality of frames including a plurality of objects. The one or more processors may identify a target object from the plurality of objects according to the plurality of frames. The one or more processors may determine one or more track points of the target object, each of the one or more track points being corresponding to the target object in one of the plurality of frames. The one or more processors may determine a first track of the target object based on the track points, the first track including at least one of the one or more track points of the target object. The one or more processors may determine a second track of the target object based on the first track, the second track including at least one of the track points of the first track. The one or more processors may generate a video analysis result by analyzing the second track. The one or more processors may visualize the video analysis result.

In some embodiments, the identifying the target object may include: obtaining object information of the plurality of objects, the object information including at least one of: an object type, an object state, an object size, a object color, an object speed, an object moving direction, an object location in a frame of the video, or a time when an object first appears in the video; determining a selection condition; and identifying the target object based on the object information and the selection condition.

In some embodiments, the determining the second track of the target object may include: obtaining the first track of the target object; determining one or more reserved track points or one or more discarded track points from the first track based on at least one of relationships between any two track points of the first track; and determining the second track based on the first track by keeping the reserved track points or removing the discarded track points.

In some embodiments, the determining the second track of the target object may include: obtaining the first track of the target object; determining a first track point of the first track as a reference track point; selecting the first track point of the first track as a first reserved track point; determining a threshold time period in the video; determining a target track point from the first track based on the reference track point and the threshold time period; selecting the target track point as a second reserved track point; and generating the second track including at least the first reserved track point and the second reserved track point.

In some embodiments, the determining the target track point may include: obtaining a reference frame, the reference frame including the reference track point; determining a target frame based on the reference frame and the threshold time period; determining whether the target frame includes a track point of the first track; and determining the track point in the target frame as the target track point if the target frame includes a track point of the first track.

In some embodiments, the determining the second track of the target object may include: obtaining the first track of the target object; determining a track point of the first track as a reference track point; determining the track point of the first track as a first reserved track point; determining a target track point from the first track based on the reference track point; determining a distance between the reference track point and the target track point; determining whether the distance is larger than a threshold distance; determining the target track point as a second reserved track point if the distance is larger than the threshold distance; and generating the second track including at least the first reserved track point and the second reserved track point.

In some embodiments, the determining the second track of the target object further may include: determining the target track point as a discarded track point if the distance is less than or equal to the sixth threshold; and generating the second track including by removing at least the discarded track point from the first track.

In some embodiments, the determining the second track of the target object may include: obtaining the first track of the target object; obtaining one frame of the plurality of frames; dividing the frame of the plurality of frames into a plurality of regions based on the track points of the first track; determining one or more reserved track points or one or more discarded track points from the first track based on the plurality of regions; and determining the second track by keeping the reserved track points or removing the discarded track points from the first track.

In some embodiments, the video analysis result may be visualized by at least one of a static heat map, a dynamic heat map, or a track map.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 3-A is a schematic diagram illustrating an exemplary analyzing engine according to some embodiments of the present disclosure;

FIG. 3-B is a flowchart illustrating an exemplary process of visualizing a video analysis result according to some embodiments of the present disclosure;

FIG. 4-A is a schematic diagram illustrating an exemplary analysis result obtaining module according to some embodiments of the present disclosure;

FIG. 4-B is a flowchart illustrating an exemplary process of generating a track analysis result according to some embodiments of the present disclosure;

DETAILED DESCRIPTION

Figure 1:
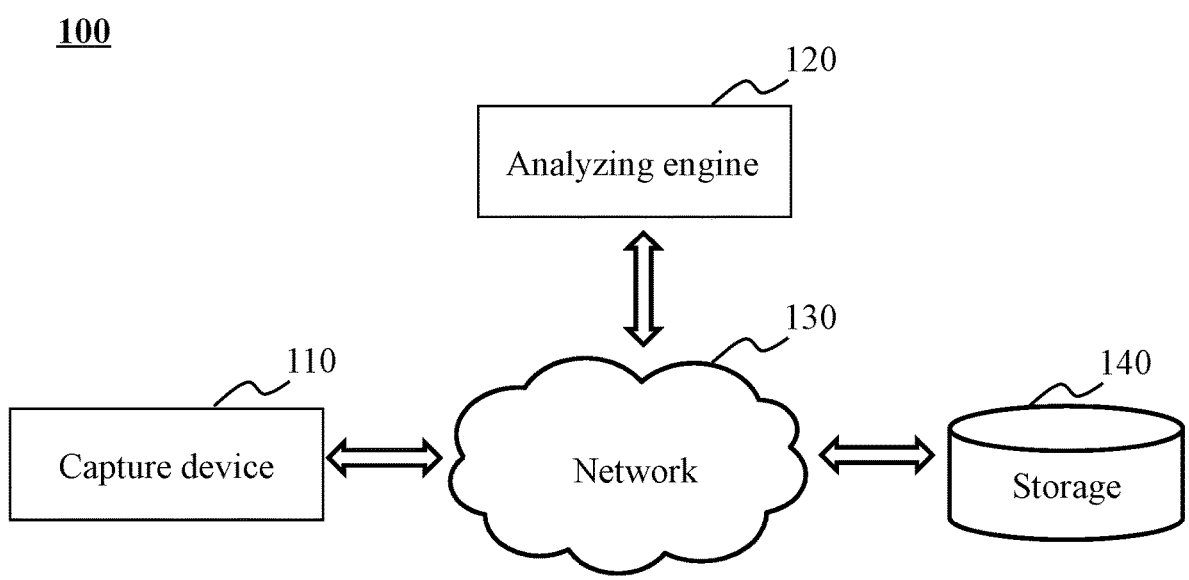
FIG. 1 is a schematic diagram illustrating an exemplary video analyzing system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, module, systems, devices, and/or drivers have been described at a relatively high-level, without detail, in order to avoid unnecessarily obscuring aspects of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "module," and/or "unit" used herein are one method to distinguish different components, elements, parts, section or assembly of different level in ascending order. However, the terms may be displaced by other expressions if they may achieve the same purpose.

It will be understood that when a device, unit, or module is referred to as being "on," "connected to," or "coupled to" another device, unit, or module, it may be directly on, connected or coupled to, or communicate with the other device, unit, or module, or an intervening device, unit, or module may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

The disclosure is directed to systems and methods for visualizing video analysis. The visualization may be implemented by selecting a part of frames of a video to analyze other than analyzing each frame of the video in order to reduce and/or eliminate errors resulting from perspective effect. Video analyzing system 100 in this disclosure may select the part of frames based on the frame rate and/or the location of an object that video analyzing system 100 wants to analyze in each frame of the video.

FIG. 1 is a schematic diagram illustrating an exemplary video analyzing system 100 according to some embodiments of the present disclosure. In some embodiments, video analyzing system 100 may be used in a system that may need analyzing videos, for example, a traffic hub system, a retail business system, a transportation management, a prison system, an astronomical observation system, or a monitoring system. Video analysis may refer to a technique used to obtain information about one or more objects (e.g., a location of an object in a video, a density of objects in an area of the background of a video) included in a video. As illustrated in FIG. 1, video analyzing system 100 may include a capture device 110, an analyzing engine 120, a network 130, and a storage 140.

Capture device 110 may be configured to capture a video. In some embodiments, capture device 110 may include a stereo camera. In some embodiments, the stereo camera may include a binocular vision device or a multi-camera. In some embodiments, capture device 110 may include a digital camera. The digital camera may include a 2D camera, a 3D camera, a panoramic camera, a virtual reality (VR) camera, a web camera, an instant picture camera, or the like, or any combination thereof. In some embodiments, capture device 110 may be added to or be part of a medical imaging equipment, a night vision equipment, a radar equipment, a sonar equipment, an electronic eye, a camcorder, a thermal imaging equipment, a smartphone, a tablet PC, a laptop, a wearable equipment (e.g., 3D glasses), an eye of a robot, or the like, or any combination thereof. In some embodiments, capture device 110 may also include an optical sensor, a radio detector, an artificial retina, a mirror, a telescope, a microscope, or the like, or any combination thereof. In some embodiments, capture device 110 may transmit the captured video to analyzing engine 120 and/or storage 140 via network 130. In some embodiments, capture device 110 may capture a video. The field of view of frames of the video may be same (or substantially similar).

Analyzing engine 120 may process information and/or data relating to a video described in the present disclosure. For example, analyzing engine 120 may generate a video analysis result by analyzing one or more videos acquired from capture device 110 and/or storage 140. As another example, analyzing engine 120 may visualize the video analysis result.

In some embodiments, analyzing engine 120 may include one or more processors (e.g., single-core processor(s) or multi-core processor(s)). Merely by way of example, the processor may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

Network 130 may be configured to facilitate communications among the components of video analyzing system 100 including capture device 110, analyzing engine 120, and storage 140. For example, network 130 may transmit data from capture device 110 to analyzing engine 120. As another example, network 130 may transmit data from capture device 110 to storage 140.

In some embodiments, network 130 may include a wired network, a wireless network, or any connection capable of transmitting and receiving data. In some embodiments, the wired network may include a connection using a metal cable, an optical cable, a hybrid cable, or the like, or any combination thereof. In some embodiments, the wireless network may include a near field communication (NFC), a body area network (BAN), a personal area network (PAN, e.g., a Bluetooth, a Z-Wave, a Zigbee, a wireless USB), a near-me area network (NAN), a local wireless network, a backbone, a metropolitan area network (MAN), a wide area network (WAN), an internet area network (IAN, or cloud), or the like, or any combination thereof. In some embodiments, capture device 110, analyzing engine 120, storage 140, input/output, or network 130 may be connected to or communicate with each other directly or indirectly.

Storage 140 may be configured to store data and/or instructions. In some embodiments, data from capture device 110 and/or analyzing engine 120 may be stored in storage 140. In some embodiments, storage 140 may include a mass storage, a removable storage, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, storage 140 may be configured to store one or more programs and/or instructions that may be executed by the processor(s) of video analyzing system 100 to perform exemplary methods described in the this disclosure. For example, storage 140 may be configured to store program(s) and/or instruction(s) executed by the processor(s) of video analyzing system 100, and when executing the programs and/or instructions, video analyzing system 100 may be configured to capture video(s), process video data, or display any intermediate result. For example, a ROM may store instructions for analyzing engine 120 to process a video.

In some embodiments, two or more components of video analyzing system 100 may be integrated in one device. For example, capture device 110, analyzing engine 120, and storage 140 may be integrated in one device (e.g., a smartphone, a laptop, a workstation, a server). In some embodiments, one or more components of video analyzing system 100 may be located remote from other components. For example, capture device 110 may be installed at a location away from analyzing engine 120, which may be implemented in a single device with storage 140. In some embodiments, analyzing engine 120 may be implemented on a cloud platform (e.g., a cloud computing platform or cloud storing platform).

It should be noted that the component of video analyzing system 100 illustrated in FIG. 1 may be implemented via various ways. For example, the components may be implemented through hardware, software, or a combination thereof. Herein, the hardware may be implemented by a dedicated logic; the software may be stored in the storage, the system may be executed by proper instructions, for example, by a microprocessor or a dedicated design hardware. Those skilled in the art can understand that, the methods and systems described in this disclosure may be implemented by the executable instructions of a computer and/or by control code in the processor, for example, the code supplied in a carrier medium such as a disk, a CD, a DVD-ROM, in a programmable storage such as a read-only memory, or in a data carrier such as optical signal carrier or electric signal carrier. The systems and the methods in the present application may be implemented by a hardware circuit in a programmable hardware device in a ultra large scale integrated circuit, a gate array chip, a semiconductor such as a transistor, a field programmable gate array, a programmable logic device, a software performed by various processors, or a combination thereof (e.g., firmware).

Figure 2:
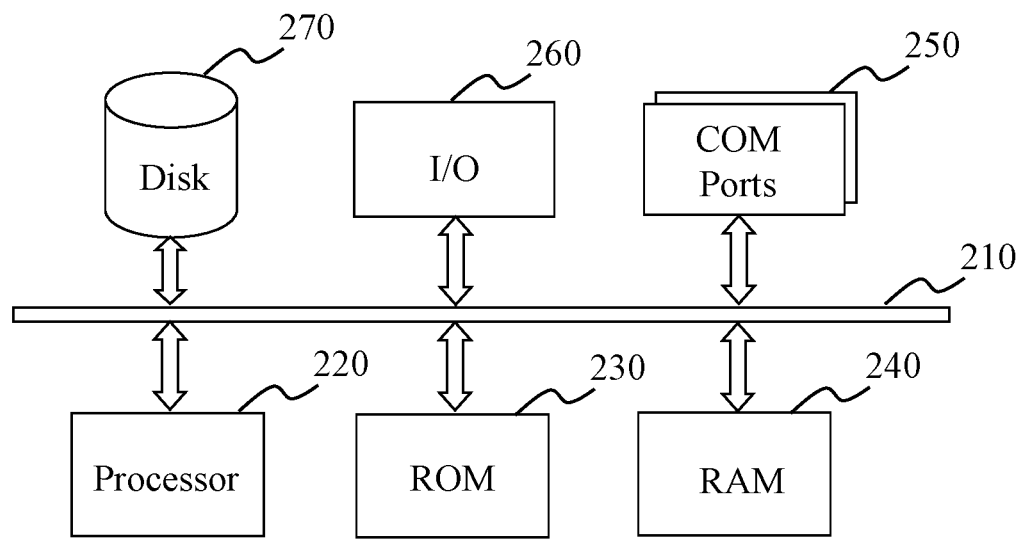
FIG. 2 is a schematic diagram illustrating exemplary hardware and software components of a computing device according to some embodiments of the present disclosure.

FIG. 2 is a schematic diagram illustrating exemplary hardware and software components of computing device 200 according to some embodiments of the present disclosure. In some embodiments, one or more components of video analyzing system 100 (e.g., analyzing engine 120) may be implemented in computing device 200. Computing device 200 may be a general purpose computer or a special purpose computer. Both can be used to implement a specialized system for the present disclosure. Computing device 200 may be used to implement any component of video analyzing system 100 and perform one or more functions thereof as described herein. For example, analyzing engine 120 may be implemented in computing device 200, via its hardware, software program, firmware, or a combination thereof. Although only one such computer is shown, for convenience, the computer functions relating to the management of the supply of service as described herein may be implemented in a distributed fashion on a number of similar platforms, to distribute the processing load.

Computing device 200 may include, for example, a communication bus 210 configured to facilitate communications between computing device 200 and other devices via, for example, a network (wired or wireless). Computing device 200 may also include a processor 220 configured to execute program instructions stored in a storage device (e.g., disk 270, ROM 230, and RAM 240) or a non-transitory computer-readable medium. When processor 220 executes the program instructions, computing device 200 may be caused to perform one or more functions disclosed in this application. For example, processor 220 may be configured to analyze a video. Processor 220 may include or is part of one or more known processing devices such as a microprocessor. For example, processor 220 may include any single or multi-core processor, mobile device microcontroller, central processing unit, etc.

Computing device 200 may also include an I/O 260, supporting input/output flows between the computing device 200 and other components therein such as user interface elements (not shown). For example, I/O 260 may include a keyboard, a mouse, a remote controller, or the like, or any combination thereof, configured to receive input and/or command from a user. I/O 260 may also include a screen, a printer, or the like, or any combination thereof, configured to output data and/or information to the user.

Computing device 200 may include COM ports 250 connected to a network (e.g., network 150) to facilitate data communications between computing device 200 and other components of video analyzing system 100. Computing device 200 may receive program(s) and data from other components of video analyzing system 100 via COM ports 250.

Hence, aspects of the methods of the image processing and/or other processes, as described herein, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors, or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a scheduling system into the hardware platform(s) of a computing environment or other system implementing a computing environment or similar functionalities in connection with image processing. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

A machine-readable medium may take many forms, including but not limited to, a tangible storage medium, a carrier wave medium or physical transmission medium. Non-volatile storage media include, for example, optical or magnetic disks, such as any of the storage devices in any computer(s), or the like, which may be used to implement the system or any of its components shown in the drawings. Volatile storage media may include dynamic memory, such as main memory of such a computer platform. Tangible transmission media may include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media may include, for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described herein may be embodied in a hardware device, it may also be implemented as a software only solution (e.g., an installation on an existing server). In addition, image processing as disclosed herein may be implemented as firmware, a firmware/software combination, a firmware/hardware combination, or a hardware/firmware/software combination.

FIG. 3-A is a schematic diagram illustrating an exemplary architecture of analyzing engine 120 according to some embodiments of the present disclosure. Analyzing engine 120 may include a video module 311, an analysis result obtaining module 312, and a visualization module 314.

Video module 311 may be configured to obtain a video. Video module 311 may obtain the video from capture device 110 and/or storage 140. The video may include a plurality of frames. The frames may be still images. The frames may be arranged one after another in order of time. The number of a frame may refer to the position of the frame in the video. For example, if there are 3 frames in a video, the number of the first frame may be 1, the number of the second frame may be 2, and the number of the third frame may be 3. In some embodiments, the background of the frames may be same. In some embodiments, the video may include one or more objects (e.g., a person, building, vehicle, or animal).

Analysis result obtaining module 312 may be configured to obtain a video analysis result for the obtained video. The video analysis result may refer to a result obtained by analyzing a video. In some embodiments, analysis result obtaining module 312 may obtain from storage 140 the video analysis result corresponding to the video. In some embodiments, analysis result obtaining module 312 may analyze the video and generate the video analysis result based on the analysis of the video. In some embodiments, the video analysis result may include locations of objects in frames of a video and/or a density of objects in an area of the background of a video. The location of an object in a frame may refer to the coordinates of the object in a coordinate system, which may be determined according to the frame.

Visualization module 314 may be configured to visualize the video analysis result. Data visualization may refer to a technique of generating a visual representation of data. The video analysis result may be visualized by a table, a chart, a map, or the like, or any combination thereof. In some embodiments, the video analysis result may be visualized by a static heat map, a dynamic heat map, a track map, or the like, or any combination thereof. The static heat map may be a graphical representation of data where the individual values (e.g., a density of objects in an area of the background of a video) are represented as colors. The dynamic heat map may include a plurality of static heat maps arranged in order of time. The track map may refer to a map that describes moving information of an object. The moving information may include a moving path of the object, a moving trend of the object, a moving direction of the object, or the like, or any combination thereof.

FIG. 3-B is a flowchart illustrating an exemplary process of visualizing a video analysis result according to some embodiments of the present disclosure. Process 300 may be implemented as an application or a set of instructions stored in a non-transitory storage medium of a computer, such as analyzing engine 120 of video analyzing system 100.

In 321, video module 311 may obtain a video. Video module 311 may obtain the video from capture device 110 and/or storage 140.

In 322, analysis result obtaining module 312 may obtain a video analysis result for the obtained video by analyzing the video. The video analysis result may refer to a result obtained by analyzing a video. In some embodiments, the video analysis result corresponding to the video may include locations of objects in frames of a video, and/or a density of objects in an area of the background of a video. For example, analysis result obtaining module 312 may divide the background of the video into a plurality of areas. The density of objects in an area may be determined by analysis result obtaining module 312 according to the number of the objects in the area and the size of the area. As another example, analysis result obtaining module 312 may obtain locations of objects in frames of the video.

In 324, visualization module 314 may visualize the video analysis result. In some embodiments, the video analysis result may be visualized by a table, a chart, a map, or the like, or any combination thereof. Further, the video analysis result may be visualized by a static heat map, a dynamic heat map, a track map, or the like, or any combination thereof.

The static heat map may show information of objects (e.g., a distribution of objects) in the video in a period of time. For example, the background of the video may be divided into a plurality of areas. The distribution may be determined according to the density of objects in an area in the background.

In some embodiments, visualization module 314 may use a heat value template and/or a transparency value template to generate the static heat map. The heat value template may be a color circle or a color band. The heat value template may be used to map one or more values into one or more colors. For example, the heat value template may map the density values of objects in different areas in a video into different colors. Merely by way of example, if the density of objects in area A is 10, the heat value template may map the density value 10 into a first color (e.g., red), and area A may be masked with the first color (e.g., red). If the density of objects in area B is 5, the heat value template may map the density value 5 into a second color (e.g., yellow), and area B may be masked with the second color (e.g., yellow). If the density of objects in area C is 2, the heat value template may map the density value into a third color (e.g., blue), and area C may be masked in the third color (e.g., blue).

The transparency value template may be used to make the colors in the static heat map gradually varied. The transparency value template may be a disk with a radius of a certain value (e.g., 32 pixels or 64 pixels). The transparency value of a point in the disk may depend on the distance between the point and the center of the disk. In other words, the transparency value may gradually decrease from the center of the disk in the radial direction. In some embodiments, visualization module 314 may determine a transparency coefficient for an area of the background based on the information of the objects (e.g., the distribution of the objects). Visualization module 314 may modify the transparency template by multiplying the transparency coefficient by the transparency value of each pixel in the transparency template. Visualization module 314 may cover the modified transparency template to the area of the background.

Visualization module 314 may generate the track map based on the locations of objects in frames of the video. Alternatively or additionally, a fitting curve of an object may be determined or generated according to the locations of the object in frames of the video. The fitting curve of the object may represent a moving path of the object, a moving trend of the object, or a moving direction of the object.

FIG. 4-A is a schematic diagram illustrating an exemplary architecture of analysis result obtaining module 312 according to some embodiments of the present disclosure. Analysis result obtaining module 312 may include a video obtaining unit 412, a target object determination unit 414, a track point determination unit 416, a first track determination unit 418, a second track determination unit 420, and a track analysis unit 422.

Video obtaining unit 412 may be configured to obtain a video from video module 311. Target object determination unit 414 may be configured to determine a target object based on the plurality of frames. In some embodiments, the target object may be used to generate a track analysis result. The target object may be selected by target object determination unit 414 from the objects in the video obtained by video obtaining unit 412.

Track point determination unit 416 may be configured to determine one or more track points. In some embodiments, a track point may represent a target object and/or indicate the position thereof in a frame of the video. In some embodiments, for a target object, a frame may include at most one track point of the target object. For example, if there are 3 frames in a video, for a target object, the track point $P_1$ may represent the target object in the first frame, the track point $P_2$ may represent the target object in the second frame, and the track point $P_3$ may represent the target object in the third frame.

First track determination unit 418 may be configured to determine a first track of the target object. A track of a target object may represent the locations of the target object in at least one of the frames. In some embodiments, the first track of the target object may include at least one of track points of the target object. In some embodiments, the first track may be a group of at least one of track points that are arranged in order of time. For example, if there are 3 frames in a video, for a target object, $P_1$, $P_2$ and $P_3$ may refer to the track points of the target object in the 3 frames, respectively. The first track of the target object may include three track points $P_1$, $P_2$ and $P_3$ and may be represented as $\{P_1, P_2, P_3\}$.

Second track determination unit 420 may be configured to determine a second track based on the first track. In some embodiments, the second track may be determined by modifying the first track. For example, second track determination unit 420 may determine the second track by removing one or more track points from the first track. The second track may be used to improve the efficiency of visualizing the video analysis result and/or to reduce the errors caused by the perspective effect in visualization. In some embodiments, the second track may include at least one of the track points of the first track.

Track analysis unit 422 may be configured to generate a track analysis result based on the second track. The track analysis result may include locations of the target object in frames of the video. For example, track analysis unit 422 may obtain locations of the target object in frames of the video according to the second track of the target object. Track analysis unit 422 may obtain locations of the target object in frames of the video according to the location information of the track points included in the second track.

FIG. 4-B is a flowchart illustrating an exemplary process of generating a video analysis result according to some embodiments of the present disclosure. Process 400 may be implemented as an application or a set of instructions stored in a non-transitory storage medium of a computer, such as analyzing engine 120 in video analyzing system 100. In some embodiments, process 400 may be used to obtain the video analysis result in 322.

In 442, video obtaining unit 412 may obtain a video having a plurality of frames that may include one or more objects. For example, video obtaining unit 412 may obtain the video from video module 311. In 444, target object determination unit 414 may determine a target object from the objects based on the plurality of frames. For example, if the objects include a moving car and a moving person, target object determination unit 414 may select the moving car as the target object based on a selection condition of a big size and a moving state.

In 446, track point determination unit may determine one or more track points of the target object. In some embodiments, a track point may be a pixel related to a target object in a frame. In some embodiments, in a frame, a target object may be identified by a bounding box. In some embodiments, the bounding box of the target object may be entered by a user or be determined by analyzing engine 120. The track point of the target object in the frame may be one of the pixels in the bounding box. For example, the track point of the target object corresponding to the frame may be a central pixel in the bounding box.

In 448, first track determination unit 418 may determine a first track of the target object over a period of time of the video. In some embodiments, the first track of the target object may include at least one of track points. In some embodiments, the first track may be a group of at least one of track points that are arranged in order of time.

In some embodiments, first track determination unit 418 may arrange the track points of the first track in order of time based on the numbers of the frames including the track points. The number of the frame may refer to the order of a frame in the video. For example, if the number of a frame is 3, it may indicate that the frame is the third frame in the video. For example, there may be 3 frames in a video. $P_1$ may be the track point of the target object in frame 1, $P_2$ may be the track point of the target object in frame 2, and $P_3$ may be the track point of the target object in frame 3. First track determination unit 418 may determine the first track as $\{P_1, P_2, P_3\}$. As another example, there may be 4 frames in a video. $P_1$ may be the track point of the target object in frame 1, $P_2$ may be the track point of the target object in frame 2, and $P_4$ may be the track point of the target object in frame 4. Frame 3 may include no track point of the target object. First track determination unit 418 may determine the first track as $\{P_1, P_2, P_4\}$.

In 450, second track determination unit 420 may determine a second track of the target object based on the first track. The second track of the target object may be determined based on the first track of the target object. The second track may be determined by keeping one or more track points from the first track, and/or by deleting one or more track points from the first track.

In 452, track analysis unit 422 may generate a track analysis result by analyzing the second track. The track analysis result may include locations of the target object in frames of the video. For example, track analysis unit 422 may obtain the location of the target object in frames of the video according to the second track of the target object. Track analysis unit 422 may obtain the locations of the target object in frames of the video according to the location information of the track points included in the second track.

In some embodiments, target object determination unit 414 may determine more than one target object. Track analysis results of other target objects may be generated by performing process 400 by analysis result obtaining module 312. In some embodiments, analysis result obtaining module 312 may determine the track analysis results at the same time. In some embodiments, analysis result obtaining module 312 may determine the track analysis results one by one.

In some embodiments, analysis result obtaining module 312 may generate a video analysis result by analyzing the track analysis results of the more than one target objects. For example, analysis result obtaining module 312 may generate the density of the more than one target objects in an area of the background of the video by analyzing the track analysis results of the more than one target objects. Analysis result obtaining module 312 may divide the background of the frames of the video into a plurality of areas. The density of the target objects in an area may be determined by analysis result obtaining module 312 according to the locations of each of the target objects in a part of frames of the video. For example, the density of the target objects in an area may be determined according to the number of the track points included in the track analysis results of each of the target objects in the area and the size of the area.

Figure 5:
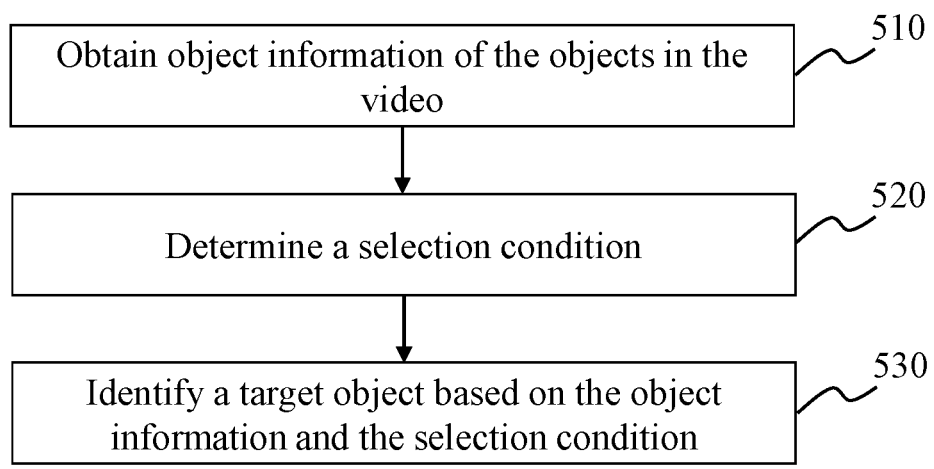
FIG. 5 is a flowchart illustrating an exemplary process of determining a target object according to some embodiments of the present disclosure.

In some embodiments, step 444 may be performed by process 500 illustrated in FIG. 5 for determining the target object according to some embodiments of the present disclosure. Process 500 may be implemented as an application or a set of instructions stored in a non-transitory storage medium of a computer, such as analyzing engine 120 in video analyzing system 100.

In 510, target object determination unit 414 may obtain object information. In some embodiments, the object information may include a type of the object, a state of the object, a size of the object, a time when the object first appears in the video, a color of the object, a speed of the object, a moving direction of the object, a location of the object, or the like, or any combination thereof.

The type of the object may include a person, a vehicle, a building, an animal, or the like. The vehicle may include a motor vehicle or a non-motor vehicle. The motor vehicle may include a car, a motorcycle, a bus, a truck, or the like, or any combination thereof. The non-motor vehicle may include a bike, a tricycle, an electric bicycle, or the like, or any combination thereof.

The state of the object may include a still state or a moving state. The still state may refer to a state in which an object stays in the same position for a period of time (e.g., a time from the beginning of the video to the end of the video). The moving state may refer to a state in which the location of an object changes in a period of time (e.g., a time from the beginning of the video to the end of the video). For example, the states of a building, a tree, a parked car, and a telegraph pole may be the still state. The states of a moving car and a moving person may be the moving state.

The size of the object may include a small size, a medium size, and a big size. In some embodiments, the size of the object may be determined based on a dimension of the object. The dimension may include a length, a height, a width, or any combination thereof. In some embodiments, if the dimension of the object is larger than or equal to a first threshold, the size of the object may be determined as the big size. If the dimension of the object is less than or equal to a second threshold, the size of the object may be determined as the small size. If the dimension of the object is less than the first threshold and larger than the second threshold, the size of the object may be determined as the medium size. The first threshold and the second threshold may be determined according to the objects in the video. For example, if there are persons, buildings and dogs in the video, the first threshold and the second threshold may be determined according to the persons, the buildings and the dogs in the video. The size of the building may be determined as the big size, the size of the person may be determined as the medium size, and the size of the dog may be determined as the small size. If there are persons, cars and trucks in the video, the first threshold and the second threshold may be determined according to the persons, the cars and the trucks in the video. The size of the truck may be determined as the big size, the size of the cars may be determined as the medium size, and the size of the person may be determined as the small size. In some embodiments, the dimension of the object may be determined according to outline information of the object. For example, the object may be identified by a bounding box that shows the outline information of the object, and the dimension of the object may be determined according the bounding box.

The color of the object may be, for example, black, white, gray, red, orange, yellow, green, cyan, blue or purple. In some embodiments, the color of the object may be approximate to the real color of the object. For example, if the real color of the object is watermelon red, the color of the object may be determined as red.

The speed of the object may include a slow speed, a medium speed and a high speed. In some embodiments, the speed of the object may be determined based on an average speed of the object over a period of time (e.g., a time from the beginning of the video to the end of the video). In some embodiments, if the average speed of the object is larger than or equal to a third threshold, the speed of the object may be determined as the high speed. If the average speed of the object is less than or equal to a fourth threshold, the speed of the object may be determined as the low speed. If the average speed of the object is less than the third threshold and larger than the fourth threshold, the speed of the object may be determined as the medium speed. The third threshold and the fourth threshold may be determined according to the average speeds of objects in the video. For example, if there are moving persons, moving bikes and moving cars in the video, the third threshold and the fourth threshold may be determined according to the moving persons, the moving bikes and the moving cars in the video. The speed of the moving cars may be determined as the high speed, the speed of the moving bikes may be determined as the medium speed, and the speed of the moving person may be determined as the low speed. If there are moving bikes, moving electric bicycles and moving cars in the video, the third threshold and the fourth threshold may be determined according to the moving bikes, the moving electric bicycles and the moving cars in the video. The speed of the moving cars may be determined as the high speed, the speed of the moving bicycles may be determined as the medium speed, and the speed of the moving bikes may be determined as the low speed.

The moving direction of the object may include a plurality of sub-directions. Further, a circle may be divided into a plurality of sectors in a specific order (e.g., a clockwise order or an anticlockwise order), and a sector may refer to a sub-direction. For example, a circle may be divided into 16 sectors in a clockwise order, and a sector with a central angle of 22.5 degree may refer to a sub-direction.

The location of the object generally refers to the location (or locations if the object is in a moving state) of the object in the frames of the video. In some embodiment, the location of the object may be presented by coordinates of the object in the frames. The coordinate system may be determined according to one of the frames of the video, if the background of the frames remains the same. The origin of the coordinate system may be a pixel in the bottom-left corner in a frame, the horizontal coordinate axis and the vertical coordinate axis may be vertical to each other and to the plane of the frame.

In 520, target object determination unit 414 may determine a selection condition. The selection condition may include a basic selection condition and an advanced selection condition. The selection condition may be determined according to the object information. The basic selection condition may be determined according to, for example, the type of the object, the size of the object, the time when the object first appears in the video, the color of the object, the moving direction of the object, or the like, or any combination thereof. In some embodiments, the basic selection condition may be determined according to an input by the user (e.g., a system operator). For example, if the user wants to analyze vehicles moving toward south, target object determination unit 414 may receive user input, as the basic selection condition, of the type of the object being vehicles, the state of the object being the moving state, and the moving direction of the object being toward south (or 90 degree).

The advanced selection condition may be determined according to, for example, the location of the object. The advanced selection condition may include a detection area, a pending area, a forbidden area, a trip line, or the like, or any combination thereof. For example, target object determination unit 414 may select an object that enters the detection area as a target object. Target object determination unit 414 may select an object that leaves the pending area as a target object. Target object determination unit 414 may select an object that does not pass the pending area as a target object. Target object determination unit 414 may select an object that passes the trip line in a specific direction as a target object. In some embodiments, the selection condition may be set by video analysis system 100 by default or automatically, or set by the user (e.g., a system operator), or a combination thereof.

In 530, target object determination unit 414 may determine a target object based on the object information and the selection condition. For example, if the objects include a moving car and a moving person, target object determination unit 414 may select the moving car as the target object based on the selection condition of the big size and the moving state.

In some embodiments, target object determination unit 414 may determine more than one target object. Target object determination unit 414 may determine other target objects by performing process 500. In some embodiments, target object determination unit 414 may determine the more than one target object at the same time. In some embodiments, target object determination unit 414 may determine the more than one target objects one by one.

Figure 6:
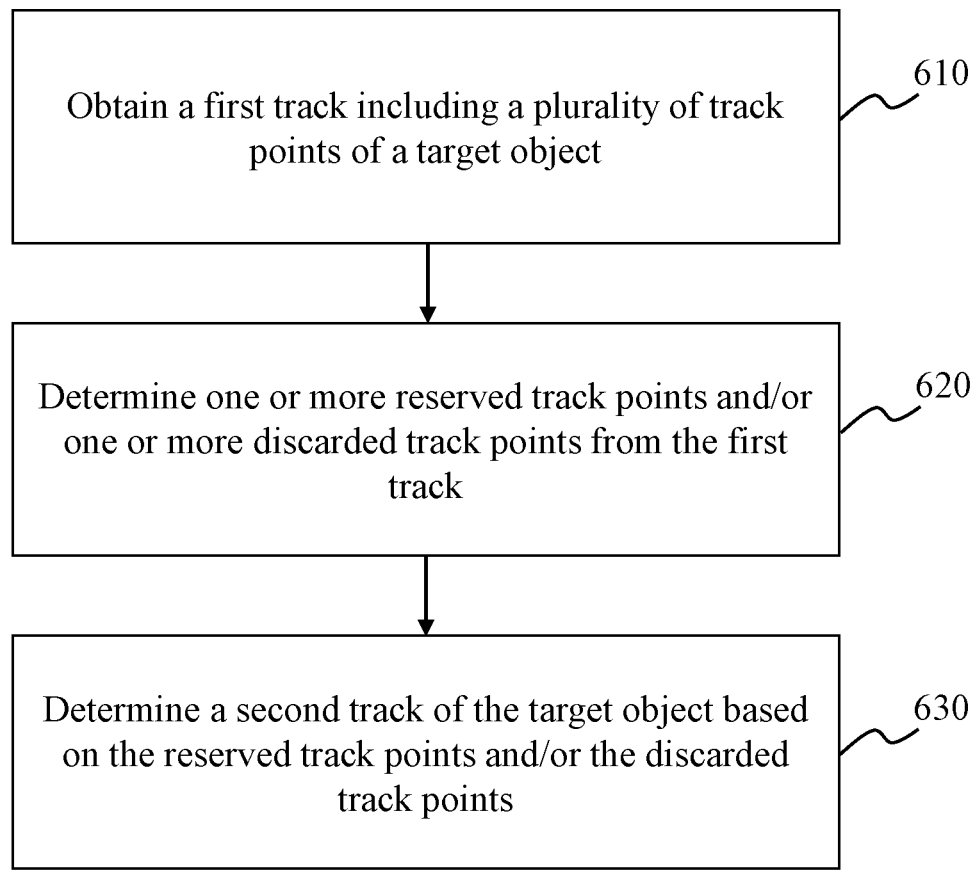
FIG. 6 is s a flowchart illustrating an exemplary process of determining a second track of a target object according to some embodiments of the present disclosure.

Back to FIG. 4-B, in some embodiments, step 450 of process 400 may be performed based on process 600 illustrated in FIG. 6 for determining one or more second tracks according to some embodiments of the present disclosure. Process 600 may be implemented as an application or a set of instructions stored in a non-transitory storage medium of a computer, such as analyzing engine 120 in video analyzing system 100. In some embodiments, second tracks corresponding to target objects may be determined by repeating process 600. In some embodiments, second track determination unit 420 may determine a plurality of second tracks at the same time. In some embodiments, second track determination unit 420 may determine a plurality of second tracks one by one.

In 610, second track determination unit 420 may obtain a first track including a plurality of track points of a target object. In 620, second track determination unit 420 may determine one or more track points to be kept (or reserved track points) and/or one or more track points to be discarded (or discarded track points) from the first track based on at least one of relationships between any two track points of the first track. There may be a perspective effect in the video because three-dimensional (3D) objects are displayed in two-dimensional (2D) frames. Because of the perspective effect, for a target object, if the target object moves from a position close to capture device 110 to another position far away from capture device 110 at a constant speed, the density of the track points in the area close to capture device 110 may be less than the density of the track points in the area far away from capture device 110 when the object is observed according to the frames of the video. However, the density of the track points close to capture device 110 may be equal to the density of the track points far away from capture device 110. So the perspective effect may cause errors when the video analysis result is visualized according to the video frames. In some embodiments, the errors caused by perspective effect may be reduced and/or eliminated by removing one or more track points that are located in the areas far away from capture device 110 from the first tracks. And the efficiency of visualizing the video analysis result may be improved by removing some track points.

A reserved point generally refers to a track point of the first track that is included (or kept) in the second track. A discarded point generally refer to a track point of the first track that is not included in the second track (or is removed from the first track). For example, if the first track includes 5 track points such as $P_1$, $P_2$, $P_3$, $P_4$, and $P_5$, second track determination unit 420 may determine $P_1$, $P_3$, and $P_5$ as the reserved track points, and may determine (and/or generate) the second track by keeping $P_1$, $P_3$, and $P_5$. Alternatively or additionally, second track determination unit 420 may determine $P_2$ and $P_4$ as the discarded track points, and may determine (and/or generate) the second track by removing $P_2$ and $P_4$.

In some embodiments, second track determination unit 420 may determine a reserved track point and/or a discarded track point based on the at least one relationships between any two track points. The relationship between two track points may include a time relationship or a space relationship. The time relationship may refer to a time interval between two track points. The time interval between two track points generally refers to the time interval between two frames that include the two track point. For example, frame 1 may include a track point $P_1$, and frame 2 may include a track point $P_2$. The time interval between $P_1$ and $P_2$ may be the time interval between frame 1 and frame 2. In some embodiments, the time interval may be presented by the number of the frame or inter-frame space (IFS). In the video, the frames may be arranged in order of time. The number of the frame may refer to the order of a frame in the video. For example, if the number of a frame is 3, it may indicate that the frame is the third frame in the video. For example, if the number of a frame is 3, the number of another frame is 6, the time interval of the two frame is 3 frames. As another example, if frames per second (FPS) is 24 (i.e., inter-frame space (IFS) is 1/24 second), the time interval between the first frame and the third frame may be 1/12 second.

The space relationship may refer to a distance between two track points. In some embodiments, the distance between the two track points may be determined according to the location information of the two track points. The location information of a track point may represent the number of the frame that the track point is included in and the coordinates of the track point in the frame. The coordinate system may be determined according to the frames of the video. For example, the location information may be represented as P (F, x, y), wherein P refers to the track point, F refers to the number of the frame in the video in which the track point is included, x refers to the horizontal coordinate of the track point, and y refers to the vertical coordinate of the track point. The origin of the coordinate system may be a pixel in the bottom-left corner in the frame, the horizontal coordinate axis and the vertical coordinate axis may be vertical to each other and in the plane of the frame. For example, if the location information of a track point is (1, 1, 1), the location information of another track point is (2, 3, 2), the distance between the two track points may be $\sqrt{5}$ (i.e., $\sqrt{(3-1)^2+(2-1)^2}$).

In some embodiments, second track determination unit 420 may determine the reserved track point and/or the discarded track point based on the at least one relationships between any two track points. For example, second track determination unit 420 may determine a first track point on the first track as a reference track point. If the time interval between the first track point and a second track point on the first track is equal to 10 frames, second track determination unit 420 may determine the second track point as a reserved track point. Second track determination unit 420 may also determine the second track point, instead of the first track point, as the reference track point. Second track determination unit 420 may determine the rest reserved track points and the rest discarded track point in the same way described above (e.g., as will be described in detail in connection with FIGS. 7 and 8). As another example, second track determination unit 420 may determine a first track point of the first track as a reference track point. If the distance between the first track point and a second track point (e.g., a track point next to the first track point in order of time) of the first track is larger than 2, second track determination unit 420 may determine the second track point as a reserved track point. Second track determination unit 420 may also determine the second track point, instead of the first track point, as the reference track point. If the distance between the first track point and a second track point of the first track is less than or equal to 2, second track determination unit 420 may determine the second track point as a discarded track point. And second track determination unit 420 may still determine the first track point as the reference track point. Second track determination unit 420 may determine the rest reserved track points and the rest discarded track point in the same way described above (e.g., as will be described in detail in connection with FIG. 10).

In 630, second track determination unit 420 may determine a second track of the target object based on the reserved track point and/or the discarded track points. In some embodiments, second track determination unit 420 may determine the second track point by keeping the reserved track points and/or deleting the discarded track points from the first track. For example, if the first track includes 5 track points such as $P_1$, $P_2$, $P_3$, $P_4$, and $P_5$, second track determination unit 420 may determine $P_1$, $P_3$, and $P_5$ as the reserved track points. Second track determination unit 420 may determine the second track by keeping $P_1$, $P_3$, and $P_5$. Alternatively or additionally, second track determination unit 420 may determine $P_2$ and $P_4$ as the discarded track points. Second track determination unit 420 may determine the second track by deleting $P_2$ and $P_4$ from the first track. The second track may include $P_1$, $P_3$, and $P_5$.

Figure 7:
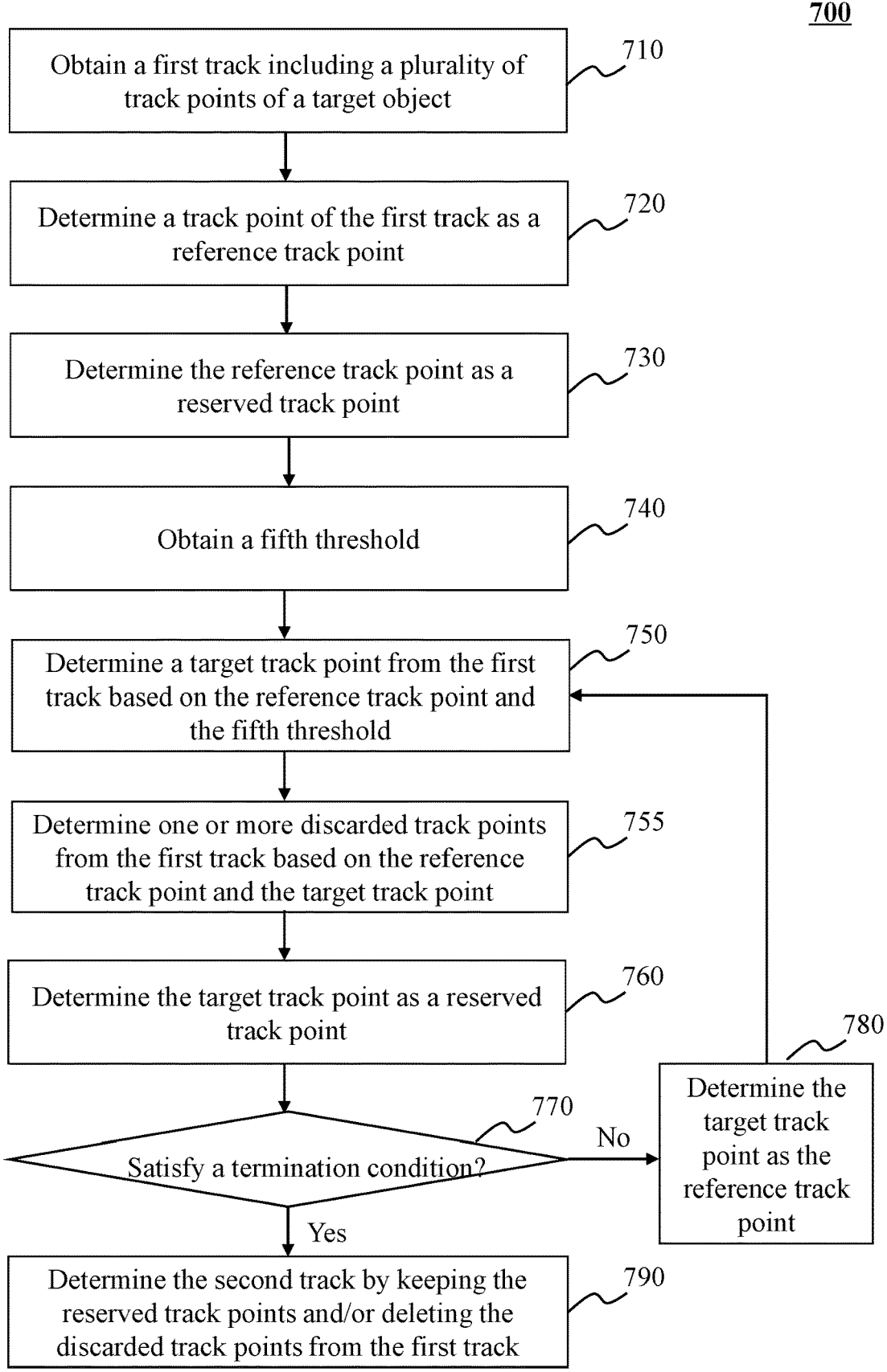
FIG. 7 is a flowchart illustrating an exemplary process of determining a second track of a target object according to some embodiments of the present disclosure.

In some embodiments, step 630 (and/or step 450) may be performed based on process 700 illustrated in FIG. 7 for determining a second track of a target object according to some embodiments of the present disclosure. Process 700 may be implemented as an application or a set of instructions stored in a non-transitory storage medium of a computer, such as analyzing engine 120 in video analyzing system 100. Other second track corresponding to other target objects may be determined by second track determination unit 420 by repeating process 700. In some embodiments, second track determination unit 420 may determine a plurality of second tracks at the same time. In some embodiments, second track determination unit 420 may determine a plurality of second tracks one by one. In some embodiments, in order to improve the efficiency of generating the video analysis result, second track determination unit 420 may delete or discard some track points of the first track over a time interval.

In 710, second track determination unit 420 may obtain a first track including a plurality of track points of a target object. In 720, second track determination unit 420 may determine a track point of the first track as a reference track point. The reference track point may be used to determine a target track point. The target track point may be used to determine the reserved track point and/or the discarded track point. Alternatively or additionally, the target track point may be used to update the reference track point. In 720, second track determination unit 420 may determine any track point of the first track as the reference track point.

In 730, second track determination unit 420 may determine the reference track point as a reserved track point. In 740, second track determination unit 420 may obtain a fifth threshold. In some embodiments, the fifth threshold may be a time period in the video.

In 750, second track determination unit 420 may determine a target track point from the first track based on the reference track point and the fifth threshold. The target track point may be used to determine the reserved track point and/or the discarded track point. Alternatively or additionally, the target track point may be used to update the reference track point. In some embodiments, the time interval between the reference track point and the target track point may be equal to or larger than the fifth threshold. The process for determining the target track point is described elsewhere in this disclosure (e.g., in connection with FIG. 8 below).

In 755, second track determination unit 420 may determine one or more discarded track points on the first track based on the reference track point and the target track point. Track points that are between the reference track point and the target track point may be determined as discarded track points. For example, if there are 5 track points in the first track, such as $P_1$, $P_2$, $P_3$, $P_4$, and $P_5$, and $P_1$ may be determined as the reference track point, and $P_5$ may be determined as a target track point. $P_2$, $P_3$, and $P_4$ may be determined as discarded track points.

In 760, second track determination unit 420 may determine the target track point as a reserved track point. In 770, second track determination unit 420 may determine whether a termination condition is met. If the answer is "yes," that is, the situation of process 700 at the present satisfies the termination condition, the process may proceed to 790. If the answer is "no," that is, the situation of process 700 at the present does not satisfy the termination condition, the process may proceed to 780. In some embodiments, the termination condition may include a condition that it is possible to determine a next reserved track point. For example, if there are 2 track points that are to be processed (e.g., track points that are to be determined as reserved track points or discarded track points), and the fifth threshold is 10 frames. Determining a next reserved track point may then be unnecessary. As another example, if there are 12 track points that are to be processed (e.g., track points that are to be determined as reserved track points or discarded track points), and the fifth threshold is 10, for this case, it may be possible to determine a next reserved track point.

In 780, second track determination unit 420 may determine the target track point as the reference track point. Then, the process may enter into a new iteration. The process may proceed to 750 to determine a next target track point based on the reference track point determined in 780 and the fifth threshold.

In step 790, second track determination unit 420 may determine the second track by keeping the reserved track points and/or deleting the discarded track points from the first track.

It should be noted that the above description of the process for determining the second track is merely provided for the purposes of illustration, and not intended to limit the scope of the present disclosure. For persons having ordinary skills in the art, multiple variations and modifications may be made under the teachings of the present disclosure. For example, 740 may be performed before 710, 720, 730 or 750. As another example, in some embodiments, 720 may be performed before 730. In some embodiments, 720 may be performed after 730. In some embodiments, 720 and 730 may be performed at the same time. In some embodiments, 755 may be optional. However, those variations and modifications do not depart from the scope of the present disclosure.

Figure 8:
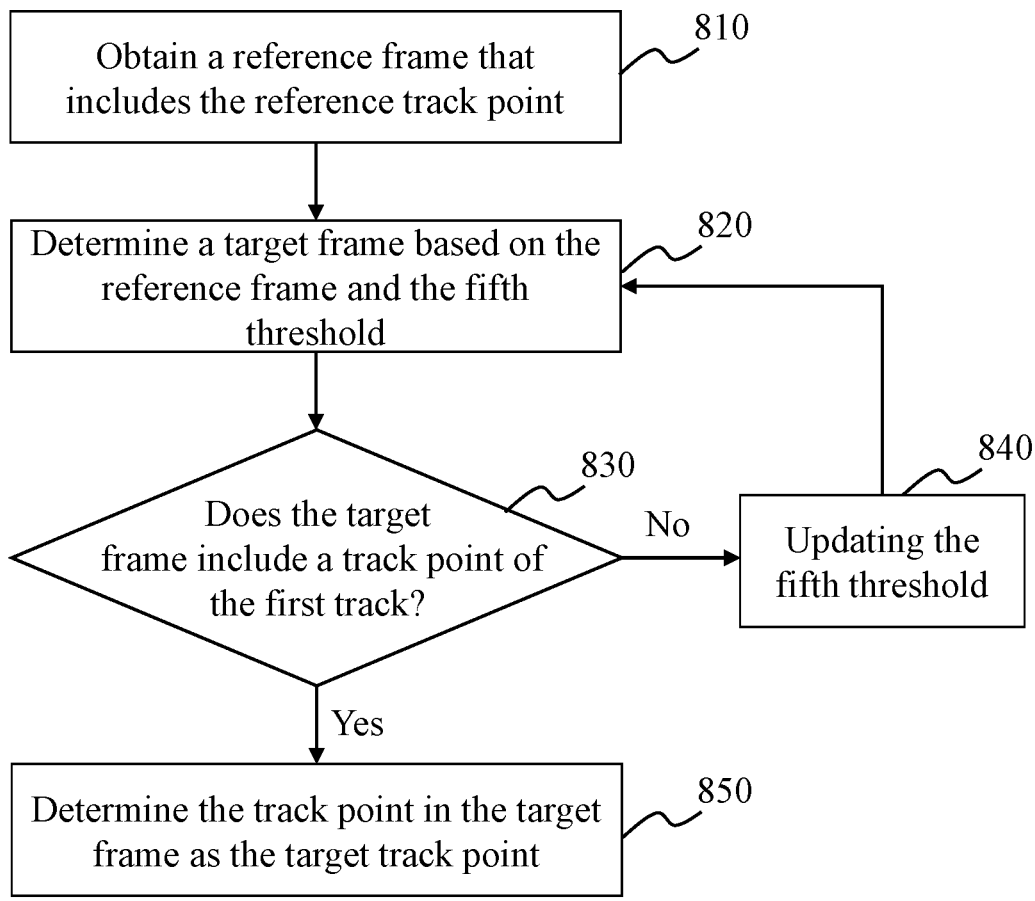
FIG. 8 is a flowchart illustrating an exemplary process of determining a target track point according to some embodiments of the present disclosure.

In some embodiments, step 750 of process 700 may be performed based on process 800 illustrated in FIG. 8 for determining a target track point according to some embodiments of the present disclosure. Process 800 may be implemented as an application or a set of instructions stored in a non-transitory storage medium of a computer, such as analyzing engine 120 in video analyzing system 100.

In step 810, second track determination unit 420 may obtain a reference frame that includes the reference track point. The reference frame may be used to determine a target frame. In step 820, second track determination unit 420 may determine a target frame based on the reference frame and the fifth threshold. In some embodiments, the time interval between the reference frame and the target frame may be equal to the fifth threshold. For example, if the fifth threshold is 10 frames, and frame 1 is determined as the reference frame by second track determination unit 420, frame 11 may be determined as the target frame by second track determination unit 420.

In step 830, second track determination unit 420 may determine whether the target frame includes a track point of the first track. In some embodiments, a target object may not appear in all frames of the video because the target object may move beyond the view of capture device 110. If the answer is "yes," that is, the target frame includes a track point of the first track, the process may proceed to 850. If the answer is "no," that is, the target frame includes no track point of the first track, the process may proceed to 840.

In 840, second track determination unit 420 may update the fifth threshold. In some embodiments, the updated fifth threshold may be larger than the original fifth threshold. For example, if the original fifth threshold is 10, the updated fifth threshold may be 11. Then, the process may enter into a new iteration. The process may proceed to 820 to determine a next target frame based on the reference frame and the updated fifth threshold.

In step 850, second track determination unit 420 may determine the track point in the target frame as the target track point.

In some embodiments, in process 700, if a target track point is determined according to process 800, the subsequent target track points may be determined by second track determination unit 420 based on the original fifth threshold or the updated fifth threshold.

In order to illustrate the process of determining the second track according to process 700 and process 800 related to the embodiments of the present disclosure, an example related to the description of the embodiments is provided below. Those having ordinary skills in the art, without further creative efforts, may apply the present disclosure to other similar scenarios according to the example.

Figure 9:
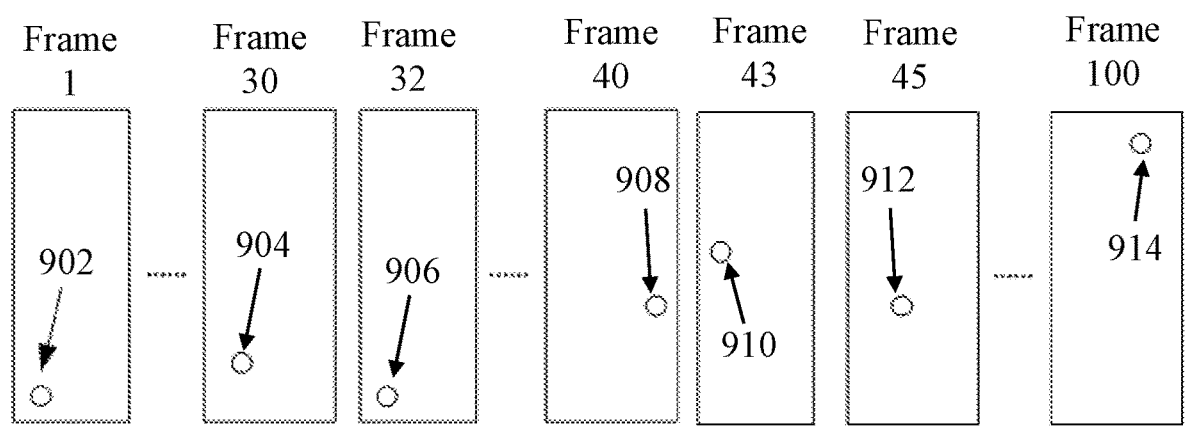
FIG. 9 is a schematic diagram illustrating a plurality of frames in a video according to some embodiments of the present disclosure.

As illustrated in FIG. 9, a video may include 100 frames, such as frame 1-frame 100. A target object may appear in frame 1-frame 30, frame 32-frame 40, frame 43, and frame 45-frame 100. A frame that includes the target object may include a track point of the target object. FIG. 9 shows track points of the target object of a part of the frames. For example, track point 902 may be a track point of the target object in frame 1. Track point 904 may be a track point of the target object in frame 30. Track point 906 may be a track point of the target object in frame 32. Track point 908 may be a track point of the target object in frame 40. Track point 910 may be a track point of the target object in frame 43. Track point 912 may be a track point of the target object in frame 45. Track point 914 may be a track point of the target object in frame 100. If the reference track point at the beginning is the track point in frame 1, and the fifth threshold is 10 frames, the reserved track points may be the track points in frame 1, frame 11, frame 21, frame 32, frame 43, frame 53, frame 63, frame 73, frame 83, and frame 93, respectively.

Figure 10:
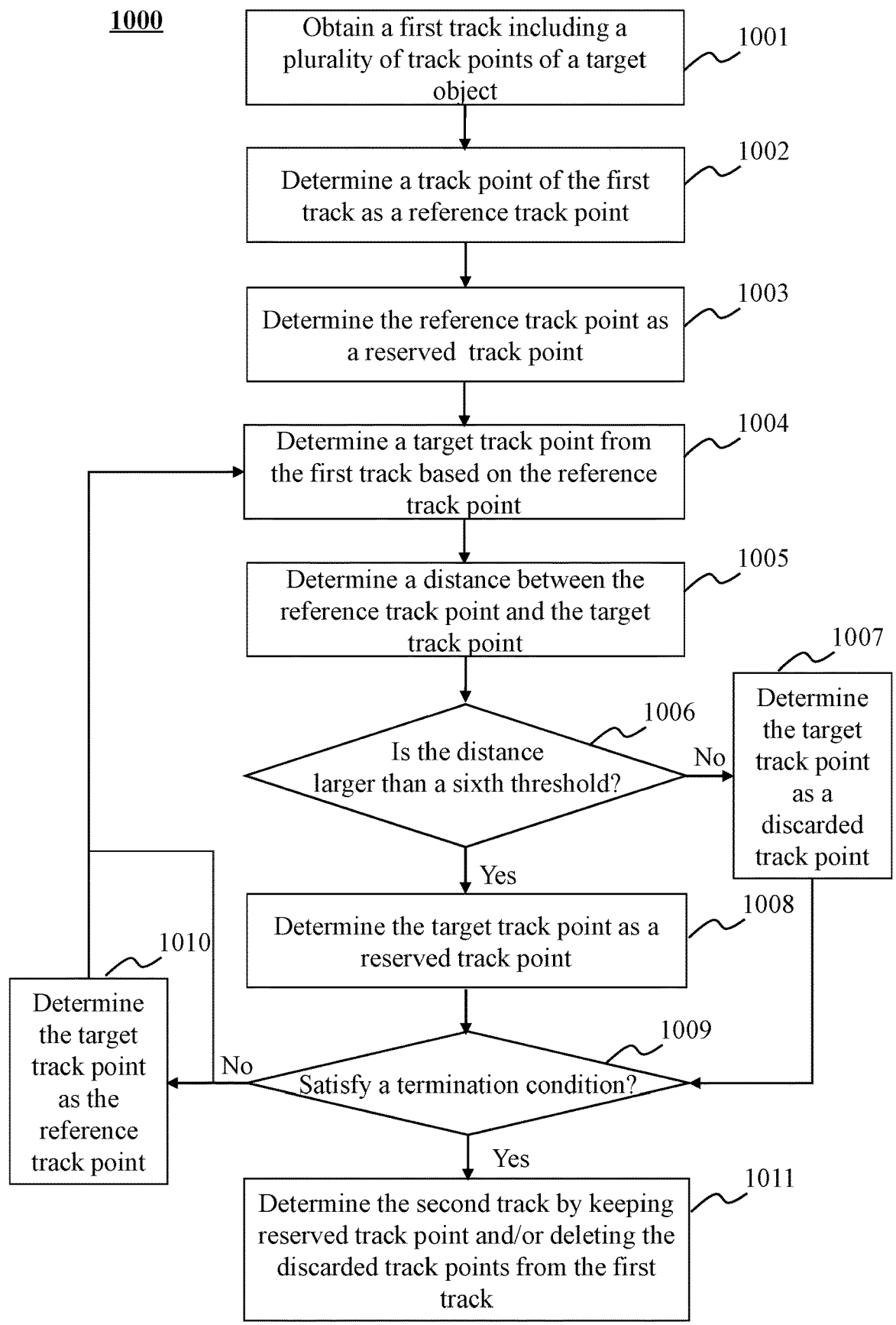
FIG. 10 is a flowchart illustrating an exemplary process of determining a second track of a target object according to some embodiments of the present disclosure.

Referring back to FIG. 6, in some embodiments, step 630 (and/or step 450) may be performed based on process 1000 illustrated in FIG. 10 for determining a second track of a target object. Process 1000 may be implemented as an application or a set of instructions stored in a non-transitory storage medium of a computer, such as analyzing engine 120 in video analyzing system 100. Other second track corresponding to other target objects may be determined by second track determination unit 420 by repeating process 1000. In some embodiments, second track determination unit 420 may determine a plurality of second tracks at the same time. Alternatively, second track determination unit 420 may determine a plurality of second tracks one by one.

In order to improve the efficiency of generating the video analysis result and reduce and/or eliminate the errors caused by perspective effect, some track points of the first track may be deleted according to a distance between two track points.

In 1001, second track determination unit 420 may obtain a first track including a plurality of track points of a target object. In 1002, second track determination unit 420 may determine a track point of the first track as a reference track point. The reference track point may be used to determine a target track point. In 1002, second track determination unit 420 may determine any track point of the first track as the reference track point. In 1003, second track determination unit 420 may determine the reference track point as a reserved track point. In some embodiments, if second track determination unit 420 determines that a track point is the reference track point, second track determination unit 420 may also determine that the track point is a reserved track point.

In 1004, second track determination unit 420 may determine a target track point among the track points on the first track. In some embodiments, first track determination unit 418 may arrange the track points of the first track in order of time based on the numbers of the frames including the track points. For example, there may be 3 frames in a video. $P_1$ may be the track point of the target object in frame 1, $P_2$ may be the track point of the target object in frame 2, and $P_3$ may be the track point of the target object in frame 3. First track determination unit 418 may determine the first track as $\{P_1, P_2, P_3\}$. As another example, there may be 4 frames in a video. $P_1$ may be the track point of the target object in frame 1, $P_3$ may be the track point of the target object in frame 3, and $P_4$ may be the track point of the target object in frame 4. Frame 2 may include no track point of the target object. First track determination unit 418 may determine the first track as $\{P_1, P_3, P_4\}$.

In some embodiments, second track determination unit 420 may determine the target track point based on the orders of the track points in the first track. For example, if first track determination unit 418 determines the first track as $\{P_1, P_2, P_3\}$, the order of $P_1$ may be 1, which indicates that $P_1$ is the first track point in the first track. The order of $P_2$ may be 2, which indicates that $P_2$ is the second track point in the first track. The order of $P_3$ may be 3, which indicates that $P_3$ is the third track point in the first track. As another example, if first track determination unit 418 determines the first track as $\{P_1, P_3, P_4\}$, the order of $P_1$ may be 1, which indicates that $P_1$ is the first track point in the first track. The order of $P_3$ may be 2, which indicates that $P_3$ is the second track point in the first track. The order of $P_4$ may be 3, which indicates that $P_4$ is the third track point in the first track.

In some embodiments, second track determination unit 420 may determine the difference between the order of the reference track point in the first track and the order of the target track point in the first track being equal to a certain number (e.g., 1). For example, if first track determination unit 418 determines the first track as $\{P_1, P_2, P_3\}$, second track determination unit 420 determines $P_1$ as the reference track point, and second track determination unit 420 determines that the difference between the order of the reference track point in the first track and the order of the target track point in the first track is equal to 1, second track determination unit 420 may determine $P_2$ as the target track point. As another example, if first track determination unit 418 determines the first track as $\{P_1, P_3, P_4\}$, second track determination unit 420 determines $P_1$ as the reference track point, and second track determination unit 420 determines that the difference between the order of the reference track point in the first track and the order of the target track point in the first track is equal to 1, second track determination unit 420 may determine $P_3$ as the target track point.

In some embodiments, the difference between the order of the reference track point in the first track and the order of the target track point in the first track may be different from the time interval between the reference track point and the target track point because one or more frames may include no track point of the target object. For example, if first track determination unit 418 determines the first track as $\{P_1, P_3, P_4\}$, second track determination unit 420 determines $P_1$ as the reference track point, and second track determination unit 420 determines the difference between the order of the reference track point in the first track and the order of the target track point in the first track being equal to 1, second track determination unit 420 may determine $P_3$ as the target track point. The difference between $P_1$ and $P_3$ may be 1, and the time interval between $P_1$ and $P_3$ may be 2 frames.

In some embodiments, the difference between the order of the reference track point in the first track and the order of the target track point in the first track determined by second track determination unit 420 in different iterations (e.g., 1004-1010) may be same or different. The target track point may be used to determine the reserved track point and/or the discarded track point. Alternatively or additionally, the target track point may be used to update the reference track point. If second track determination unit 420 determines the target track point as a reserved track point, second track determination unit 420 may determine the target track point as the reference track point.

In 1005, second track determination unit 420 may determine a distance between the reference track point and the target track point. In some embodiments, the distance between the reference track point and the target track point may be a Euclidean distance. If the locations of the reference track point and the target track point are respectively presented as $(F_r, x_r, y_r)$ and $(F_t, x_t, y_t)$, the distance between the reference track point and the target track point may be determined by Equation (1) as follows:

$$D=\sqrt{(x_t-x_r)^2+(y_t-y_r)^2} \qquad (1),$$

wherein D refers to the distance between the reference track point and the target track point, $F_r$ refers to the number of the frame including the reference track point, $F_t$ refers to the number of the frame including the target track point, $x_r$ refers to the horizontal coordinate of the reference track point, $y_r$ refers to the vertical coordinate of the reference track point, $x_t$ refers to the horizontal coordinate of the target track point, and $y_t$ refers to the vertical coordinate of the target track point.

For example, if the locations of the reference track point and the target track point are respectively presented as (1, 4, 1) and (2, 4, 2), the distance between the reference track point and the target track point may be 1 (i.e., $\sqrt{(4-4)^2+(2-1)^2}$).

In 1006, second track determination unit 420 may determine whether the distance is larger than a sixth threshold. If the answer is "yes" (i.e., the distance is larger than the sixth threshold), the process may proceed to 1008. In 1008, second track determination unit 420 may determine the target track point as a reserved track point. If the answer is "no" (i.e., the distance is less than or equal to the sixth threshold), the process may proceed to 1007. In 1007, second track determination unit 420 may determine the target track point as a discarded track point.

The sixth threshold may relate to the space relationship between two track points. For example, the sixth threshold may be a threshold distance between two track points. There may be a perspective effect in the video because 3D (3-Dimension) objects are displayed in 2D (2-Dimension) frames. Because of the perspective effect, if the target object moves from a position close to capture device 110 to another position far away from capture device 110 at a constant speed, the density of the track points in the area close to capture device 110 may be less than the density of the track points in the area far away from capture device 110. However, the density of the track points close to capture device 110 may be equal to the density of the track points far away from capture device 110. The perspective effect may cause errors when the video analysis result is visualized. Step 1006 may be used to reduce and/or eliminate the errors caused by perspective effect.

In some embodiments, the sixth threshold may be a maximum distance among the distances between two adjacent track points of the first track. For example, if the first track is referred to as $\{P_1, P_2, P_3, P_4, P_5\}$, and the location information of the track points of the first track is referred to as: $P_1=(1, 1, 1)$, $P_2=(2, 2, 4)$, $P_3=(3, 2, 6)$, $P_4=(4, 3, 5)$, $P_5=(5, 3, 7)$. The maximum distance may be $\sqrt{10}$ (i.e., $\sqrt{(2-1)^2+(4-1)^2}$), which is also the distance between $P_1$ and $P_2$. Second track determination unit 420 may determine this maximum distance as the sixth threshold.

In some embodiments, the sixth threshold may be an average distance of the distances between two adjacent track points of the first track. For example, if the first track is referred to as $\{P_1, P_2, P_3, P_4, P_5\}$, and the locations of the track points of the first track are referred to as: $P_1=(1, 3, 7)$, $P_2=(2, 3, 8)$, $P_3=(3, 4, 8)$, $P_4=(4, 5, 8)$, $P_5=(5, 5, 12)$. The average distance may be 5/4

$$\left(\text{i.e., } \frac{1+1+1+2}{4}\right),$$

and the sixth threshold may be 5/4.

In some embodiments, the sixth threshold may be determined by a user (e.g., a system operator) and received as an input by second track determination unit 420.

In 1009, second track determination unit 420 may determine whether a termination condition is satisfied. If the answer is "yes," the process may proceed to 1011. If the answer is "no," the process may proceed to 1010 or 1004. In some embodiments, the termination condition may include a condition that it is possible to determine a next reserved track point. For example, if there is no track point that are to be processed (e.g., track points that are to be determined as reserved track points or discarded track points), it may not be possible to determine a next reserved track point. As another example, if there is one track point that are to be processed (e.g., track points that are to be determined as reserved track points or discarded track points), it may be possible to determine a next reserved track point.

In some embodiments, if the target track point is determined as a reserved track point in 1004, and the answer of the determination of step 1009 is "no," the process may proceed to 1010. In 1010, second track determination unit 420 may determine the target track point as the reference track point. Then, the process may enter into a new iteration (i.e., steps 1004-1010) to determine a next target track point. The process may proceed to 1004 to determine a next target track point based on the reference track point determined in 1010.

In some embodiments, if the target track point in 1004 is determined as a discarded track point, and the answer of 1009 is "no," the process may proceed to 1004 to enter into a new iteration (i.e., steps 1004-1010) to determine a next target track point based on the reference track point determined in the last iteration.

In step 1011, second track determination unit 420 may determine the second track by keeping the reserved track points and/or deleting the discarded track points from the first track.

In order to illustrate the process of determine the second track according to process 1000 related to the embodiments of the present disclosure, an example related to the description of the embodiments is provided below. Those having ordinary skills in the art, without further creative efforts, may apply the present disclosure to other similar scenarios according to the example. In this example, a video may include 5 frames. The track points of the target object in the frames may be referred to as $P_1$, $P_2$, $P_3$, $P_4$, and $P_5$. The first track may be referred as $\{P_1, P_2, P_3, P_4, P_5\}$. The locations of the track points may be referred to as: $P_1=(1, 1, 1)$, $P_2=(2, 2, 4)$, $P_3=(3, 2, 6)$, $P_4=(4, 3, 5)$, $P_5=(5, 3, 7)$. At the beginning, $P_1$ may be determined as the reference track point and a reserved track point, and the target track point may be $P_2$. The sixth threshold may be 2. The distance between $P_1$ and $P_2$ is $\sqrt{10}$. $P_2$ may be determined as a reserved track point because the distance (i.e., $\sqrt{10}$) is greater than the sixth threshold (i.e., 2). $P_2$ may be determined as the reference track point. The target point may be $P_3$. The distance between $P_2$ and $P_3$ is 2. $P_3$ may be determined as a discarded track point because the distance (i.e., 2) is equal to the sixth threshold (i.e., 2). The reference track point may be still $P_2$. The target point may be $P_4$. The distance between $P_2$ and $P_4$ is $\sqrt{2}$. $P_4$ may be determined as a discarded track point because the distance (i.e., $\sqrt{2}$) is less than the sixth threshold (i.e., 2). The reference track point may be still $P_2$. The target point may be $P_5$. The distance between $P_2$ and $P_5$ is $\sqrt{10}$. $P_5$ may be determined as a reserved track point because the distance (i.e., $\sqrt{10}$) is larger than the sixth threshold (i.e., 2). The second track may be determined by second track determination unit 420 by keeping $P_1$, $P_2$, and $P_5$ and/or deleting $P_3$ and $P_4$. The second track may include $P_1$, $P_2$, and $P_5$, and may be represented as $\{P_1, P_2, P_5\}$.

In some embodiments, if second track determination unit 420 determines a track point between the first track point and the last track point in the first track as the reference track point in 1002, second track determination unit 420 may first determine a target track point among the track points in the first track that are in one side of the reference track point (e.g., the track points in the first track that are after the reference track point) in 1004. Second track determination unit 420 may determine a target track point among the track points in the first track that are in the other side of the reference track point (e.g., the track points in the first track that are before the reference track point) in 1004 when all of the track points that are in the one side of the reference track point (e.g., the track points in the first track that are after the reference track point) are processed by second track determination unit 420. For example, if first track determination unit 418 determines the first track as $\{P_1, P_2, P_3, P_4, P_5, P_6, P_7, P_8, P_9, P_{10}\}$, and second track determination unit 420 determines $P_5$ as the reference track point in 1002, second track determination unit 420 may determine a target track point among $P_6$ to $P_{10}$. When second track determination unit 420 determines that all of $P_6$ to $P_{10}$ are processed, second track determination unit 420 may determine a target track point among $P_1$ to $P_4$ and determine $P_5$ as the reference track point.

In some embodiments, 1002 may be performed before 1003. Alternatively, 1002 may be performed after 1003, or 1002 and 1003 may be performed at the same time.

Figure 11:
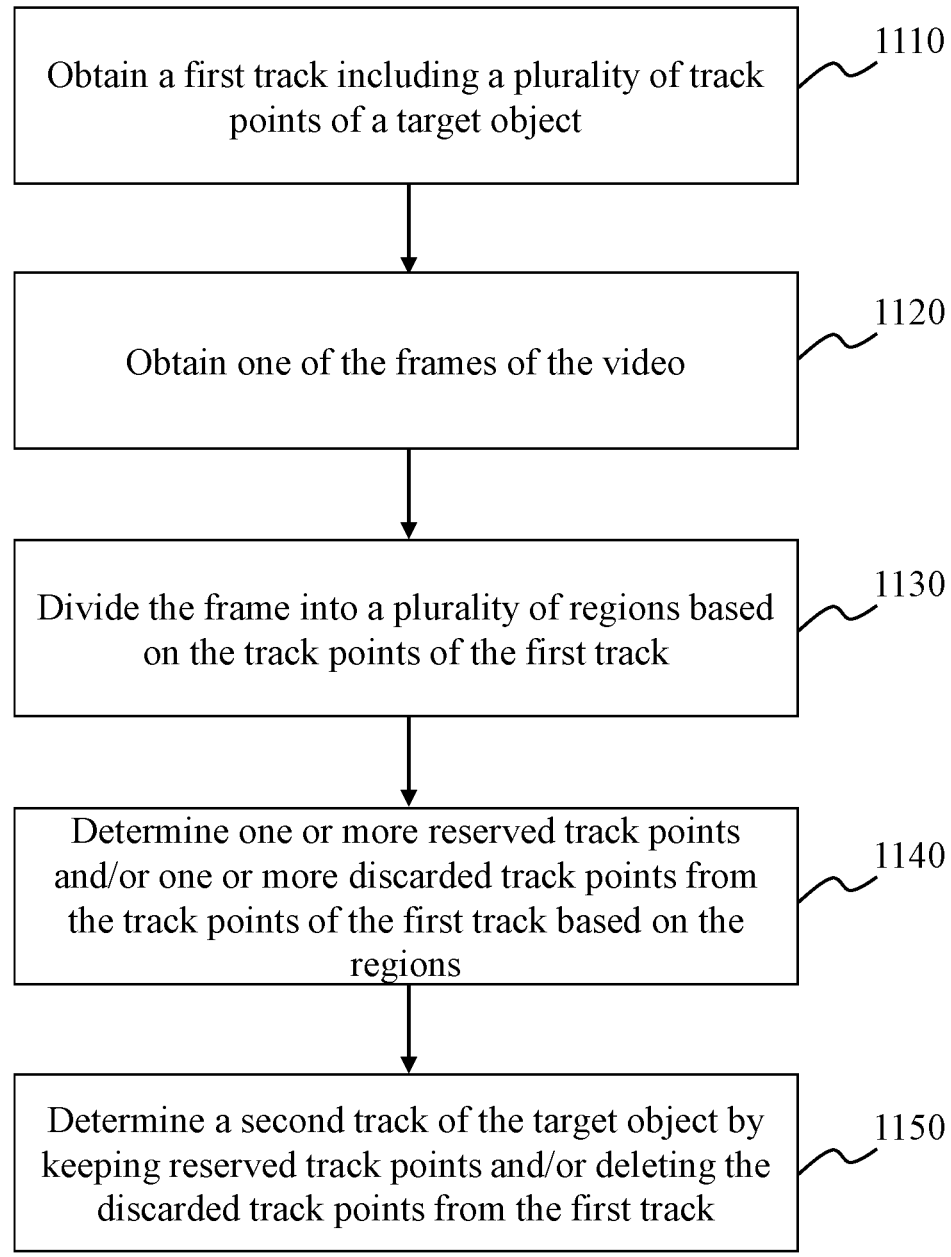
FIG. 11 is a flowchart illustrating an exemplary process of determining a second track of a target object according to some embodiments of the present disclosure.

Back to FIG. 6 and/or FIG. 4, in some embodiments, step 630 (and/or step 450) may be performed based on process 1100 illustrated in FIG. 11 for determining a second track of a target object according to some embodiments of the present disclosure. Process 1100 may be implemented as an application or a set of instructions stored in a non-transitory storage medium of a computer, such as analyzing engine 120 in video analyzing system 100. Other second track corresponding to other target objects may be determined by second track determination unit 420 by repeating process 1100. In some embodiments, second track determination unit 420 may determine a plurality of second tracks at the same time. In some embodiments, second track determination unit 420 may determine a plurality of second tracks one by one.

In order to improve the efficiency of video analysis and reduce and/or eliminate the errors caused by the perspective effect, some track points of the first track may be deleted according to the distance between two track points.

In 1110, second track determination unit 420 may obtain a first track including a plurality of track points of a target object. In 1120, second track determination unit 420 may obtain one of the frames of the video. In some embodiments, the backgrounds of the frames may be same.

In 1130, second track determination unit 420 may divide the frame into a plurality of regions based on the track points of the first track. In some embodiments, the shape of the region may include square, round, rectangular, polygon, or the like, or any combination thereof. The shapes of the regions may be same or different. In some embodiments, the sizes of the regions may be same or different. For example, the frame may be divided into 100 squares, and each of the squares may have a size of 9*9 pixels. In some embodiments, the frame may be determined according to the distance between two track points of the first track to reduce and/or eliminate the errors caused by the perspective effect. For example, if the size of the region is too small, the track points in the regions far away from capture device 110 may be deleted. Further, the frame may be determined by second track determination unit 420 according to the distance between any two track points of the first track.

In 1140, second track determination unit 420 may determine one or more reserved track points and/or one or more discarded track points from the track points of the first track based on the regions. In some embodiments, the track points in the other frames may be mapped into the frame because the backgrounds of the frames in the video are same.

In some embodiments, second track determination unit 420 may determine one or more reserved track points and/or one or more discarded track points from a region. The reserved track points and/or the discarded track points may be determined according to a standard by second track determination unit 420. For example, second track determination unit 420 may determine one reserved track point from one region that includes at least one track point of the first track. As another example, the track point of the first track of which both of the horizontal coordinate and the vertical coordinate are least in a region may be determined as a reserved track point by second track determination unit 420. For instance, if a region includes 3 track points referred to as $P_1$, $P_2$, and $P_3$. The locations of the 3 track points may be represented as: $P_1$ (1, 1, 1), $P_2$ (2, 2, 4), $P_3$ (3, 2, 2). $P_1$ may be determined as a reserved track point by second track determination unit 420. Alternatively or additionally, $P_2$ and $P_3$ may be determined as discarded track points by second track determination unit 420. In some embodiments, the standards of determining the reserved track points and/or the discarded track points of different regions may be same or different.

In 1150, second track determination unit 420 may determine a second track of the target object by keeping reserved track points and/or deleting the discarded track points from the first track.

In some embodiments, the standards of dividing a frame and the standards of determining the reserved track points for different target objects may be same.

In order to illustrate the process of determine the second track according to process 1100 related to the embodiments of the present disclosure, an example related to the description of the embodiments is provided below. Those having ordinary skills in the art, without further creative efforts, may apply the present disclosure to other similar scenarios according to the example.

Figure 12:
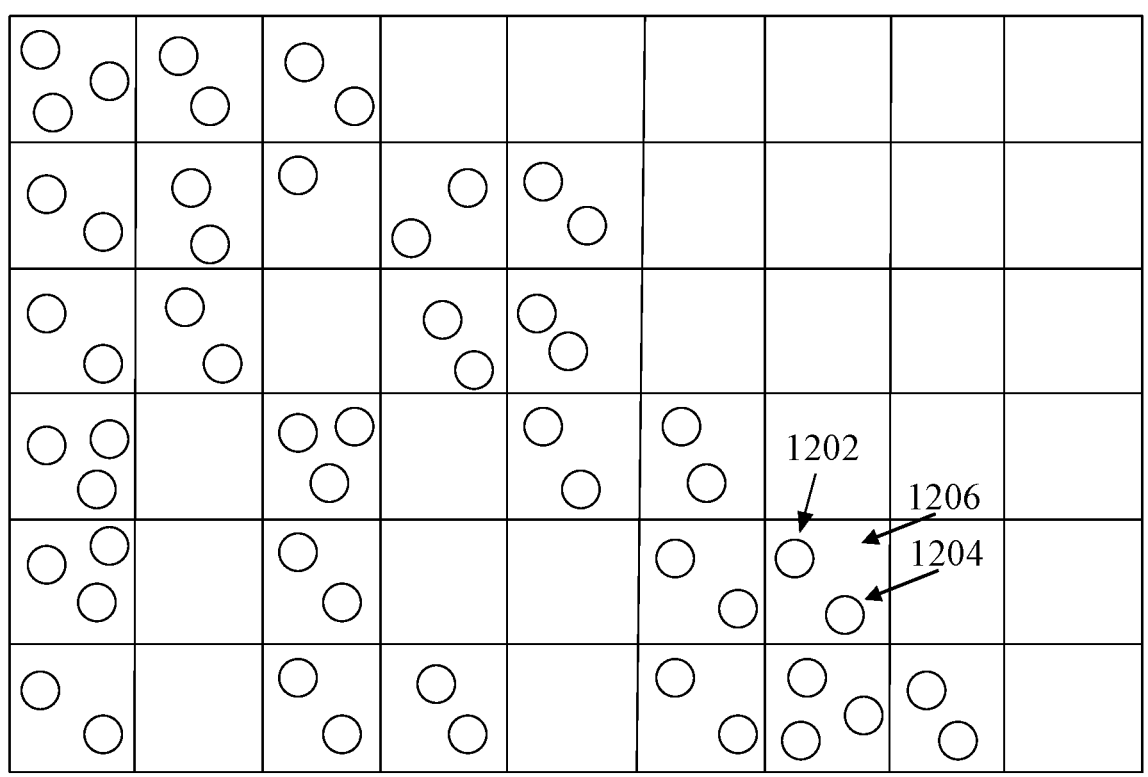
FIG. 12 is a schematic diagram illustrating a frame that is divided into a plurality of regions according to some embodiments of the present disclosure.

As illustrated in FIG. 12, a frame of a video was divided into 54 square regions. The track points in the other frames were mapped into the frame. Taking region 1206 for example, region 1206 includes two track points 1202 and 1204. If the standard of determining the reserved track point is that one reserved track point is determined from the regions that include at least one track point of the first track, and the track point of the first track of which both of the horizontal coordinate and the vertical coordinate are least in a region, second track determination unit 420 may determine 1202 as a reserved track point. Alternatively or additionally, second track determination unit 420 may determine 1204 as a discarded track point.

In some embodiments, the thresholds (e.g., the fifth threshold, the sixth threshold, or the like) mentioned in this disclosure may be obtained based on historical data, default settings of analyzing engine 120, or an instruction received from a user.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for visualizing video analysis implemented on a machine having one or more processors and one or more storage devices, comprising:
   obtaining a video having a plurality of frames including a plurality of objects;
   identifying a target object from the plurality of objects according to the plurality of frames;
   determining a plurality of track points of the target object, each of the plurality of track points being corresponding to the target object in one of the plurality of frames;
   determining a first track of the target object based on the track points, the first track including at least one of the plurality of track points of the target object;
   determining a second track of the target object based on the first track, the second track including at least one of the track points of the first track;
   generating a video analysis result by analyzing the second track; and
   visualizing the video analysis result;
   wherein the determining the second track of the target object includes:
      obtaining the first track of the target object;
      determining a first reference track point from the first track;

determining the reference track point as a first reserved track point;

determining a first target track point from the first track based on the reference track point;

determining a distance between the first reference track point and the first target track point;

determining whether the distance is larger than a threshold distance;

in response to determining that the distance is larger than the threshold distance, determining the first target track point as a second reserved track point; and generating the second track including at least the first reserved track point and the second reserved track point.

2. The method of claim 1, wherein the identifying the target object includes:

obtaining object information of the plurality of objects, the object information including at least one of: an object type, an object state, an object size, a object color, an object speed, an object moving direction, an object location in a frame of the video, or a time when an object first appears in the video;

determining a selection condition; and identifying the target object based on the object information and the selection condition.

3. The method of claim 1, wherein the determining the second track of the target object includes:

obtaining the first track of the target object;

determining one or more reserved track points or one or more discarded track points from the first track based on at least one of relationships between any two track points of the first track; and determining the second track based on the first track by keeping the reserved track points or removing the discarded track points.

4. The method of claim 1, wherein the determining the second track of the target object includes:

obtaining the first track of the target object;

determining a second reference track point from the first track;

selecting the second reference track point as a third reserved track point;

determining a threshold time period in the video;

determining a second target track point from the first track based on the second reference track point and the threshold time period;

selecting the second target track point as a fourth reserved track point; and generating the second track including at least the first reserved track point and the fourth reserved track point.

5. The method of claim 4, wherein the determining the second target track point includes:

obtaining a reference frame, the reference frame including the second reference track point;

determining a target frame based on the second reference frame and the threshold time period;

determining whether the target frame includes a track point of the first track; and in response to determining that the target frame includes a track point of the first track, determining the track point in the target frame as the second target track point.

6. The method of claim 1, wherein the determining the second track of the target object further includes:

in response to determining that the distance is less than or equal to the threshold distance, determining the first target track point as a discarded track point; and generating the second track by removing at least the discarded track point from the first track.

7. The method of claim 1, wherein the determining the second track of the target object includes:

obtaining the first track of the target object;

obtaining one frame of the plurality of frames;

dividing the frame of the plurality of frames into a plurality of regions based on the plurality of track points of the first track;

determining one or more third reserved track points or one or more discarded track points from the first track based on the plurality of regions; and determining the second track by keeping the one or more third reserved track points or removing the one or more discarded track points from the first track.

8. The method of claim 1, wherein the video analysis result is visualized by at least one of a static heat map, a dynamic heat map, or a track map.

9. A system for visualizing video analysis, comprising:

one or more storage devices including instructions; and one or more processors in communication with the one or more storage devices, wherein the one or more processors, when executing the instructions, are configured to cause the system to:

obtain a video having a plurality of frames including a plurality of objects;

identify a target object from the plurality of objects according to the plurality of frames;

determine a plurality of track points of the target object, each of the plurality of track points being corresponding to the target object in one of the plurality of frames;

determine a first track of the target object based on the track points, the first track including at least one of the plurality of track points of the target object;

determine a second track of the target object based on the first track, the second track including at least one of the track points of the first track;

generate a video analysis result by analyzing the second track; and visualize the video analysis result;

wherein the determining the second track of the target object includes:

obtaining the first track of the target object;

determining a first reference track point from the first track;

determining the reference track point as a first reserved track point;

determining a first target track point from the first track based on the reference track point;

determining a distance between the first reference track point and the first target track point;

determining whether the distance is larger than a threshold distance;

in response to determining that the distance is larger than the threshold distance, determining the first target track point as a second reserved track point; and generating the second track including at least the first reserved track point and the second reserved track point.

10. The system of claim 9, wherein the identifying the target object includes:

obtaining object information of the plurality of objects, the object information including at least one of: an object type, an object state, an object size, a object color, an object speed, an object moving direction, an object location in a frame of the video, or a time when an object first appears in the video;
determining a selection condition; and
identifying the target object based on the object information and the selection condition.

11. The system of claim 9, wherein the determining the second track of the target object includes:
obtaining the first track of the target object;
determining one or more reserved track points or one or more discarded track points from the first track based on at least one of relationships between any two track points of the first track; and
determining the second track based on the first track by keeping the reserved track points or removing the discarded track points.

12. The system of claim 9, wherein the determining the second track of the target object includes:
obtaining the first track of the target object;
determining a second reference track point from the first track;
selecting the second reference track point as a third reserved track point;
determining a threshold time period in the video;
determining a second target track point from the first track based on the second reference track point and the threshold time period;
selecting the second target track point as a fourth reserved track point; and
generating the second track including at least the third reserved track point and the fourth reserved track point.

13. The system of claim 12, wherein the determining the second target track point includes:
obtaining a reference frame, the reference frame including the second reference track point;
determining a target frame based on the second reference frame and the threshold time period;
determining whether the target frame includes a track point of the first track; and
in response to determining that the target frame includes a track point of the first track, determining the track point in the target frame as the second target track point.

14. The system of claim 9, wherein the determining the second track of the target object further includes:
in response to determining that the distance is less than or equal to the threshold distance, determining the first target track point as a discarded track point; and
generating the second track by removing at least the discarded track point from the first track.

15. The system of claim 9, wherein the determining the second track of the target object includes:
obtaining the first track of the target object;
obtaining one frame of the plurality of frames;
dividing the frame of the plurality of frames into a plurality of regions based on the plurality of track points of the first track;
determining one or more third reserved track points or one or more discarded track points from the first track based on the plurality of regions; and
determining the second track by keeping the one or more third reserved track points or removing the one or more discarded track points from the first track.

16. The system of claim 9, wherein the video analysis result is visualized by at least one of a static heat map, a dynamic heat map, or a track map.

17. A non-transitory computer readable medium embodying a computer program product, the computer program product comprising instructions configured to cause a computer device to:
obtain a video having a plurality of frames including a plurality of objects;
identify a target object from the plurality of objects according to the plurality of frames;
determine a plurality of track points of the target object, each of the plurality of track points being corresponding to the target object in one of the plurality of frames;
determine a first track of the target object based on the track points, the first track including at least one of the plurality of track points of the target object;
determine a second track of the target object based on the first track, the second track including at least one of the track points of the first track;
generate a video analysis result by analyzing the second track; and
visualize the video analysis result;
wherein the determining the second track of the target object includes:
obtaining the first track of the target object;
determining a first reference track point from the first track;
determining the reference track point as a first reserved track point;
determining a first target track point from the first track based on the reference track point;
determining a distance between the first reference track point and the first target track point;
determining whether the distance is larger than a threshold distance;
in response to determining that the distance is larger than the threshold distance, determining the first target track point as a second reserved track point; and
generating the second track including at least the first reserved track point and the second reserved track point.

18. The non-transitory computer readable medium of claim 17, wherein the determining the second track of the target object includes:
obtaining the first track of the target object;
determining one or more reserved track points or one or more discarded track points from the first track based on at least one of relationships between any two track points of the first track; and
determining the second track based on the first track by keeping the reserved track points or removing the discarded track points.

19. The non-transitory computer readable medium of claim 17, wherein the determining the second track of the target object includes:
obtaining the first track of the target object;
determining a second reference track point from the first track;
selecting the second reference track point as a third reserved track point;
determining a threshold time period in the video;
determining a second target track point from the first track based on the second reference track point and the threshold time period;
selecting the second target track point as a fourth reserved track point; and
generating the second track including at least the third reserved track point and the fourth reserved track point.

20. The non-transitory computer readable medium of claim 17, wherein the determining the second track of the target object includes:
- obtaining the first track of the target object;
- obtaining one frame of the plurality of frames;
- dividing the frame of the plurality of frames into a plurality of regions based on the plurality of track points of the first track;
- determining one or more third reserved track points or one or more discarded track points from the first track based on the plurality of regions; and
- determining the second track by keeping the one or more third reserved track points or removing the one or more discarded track points from the first track.

\* \* \* \* \*